United States Patent
Im et al.

(10) Patent No.: US 9,588,280 B2
(45) Date of Patent: Mar. 7, 2017

(54) BACKLIGHT ASSEMBLY AND DISPLAY APPARATUS INCLUDING THE SAME

(71) Applicant: Samsung Display Co., LTD., Yongin, Gyeonggi-Do (KR)

(72) Inventors: Hyun-Deok Im, Seoul (KR); Jong-Hyuk Kang, Suwon-si (KR); Jung-Hyun Kwon, Seoul (KR); Jae-Byung Park, Seoul (KR); Hae-Il Park, Seoul (KR); Dong-Hoon Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 145 days.

(21) Appl. No.: 14/303,814

(22) Filed: Jun. 13, 2014

(65) Prior Publication Data
US 2015/0131321 A1 May 14, 2015

(30) Foreign Application Priority Data
Nov. 13, 2013 (KR) .......................... 10-2013-0137512

(51) Int. Cl.
*F21V 8/00* (2006.01)
*G02F 1/1335* (2006.01)

(52) U.S. Cl.
CPC ............ *G02B 6/0068* (2013.01); *G02B 6/009* (2013.01); *G02B 6/0073* (2013.01); *G02F 1/133603* (2013.01); *G02F 1/133615* (2013.01); *G02F 2001/133607* (2013.01); *G02F 2001/133613* (2013.01)

(58) Field of Classification Search
CPC .... G02B 6/0073; G02B 6/009; G02B 6/0068; G02F 1/133603; G02F 1/133615; G02F 2001/133607; G02F 2001/133613
USPC .... 362/611, 612, 613, 97.1, 97.2, 97.3, 231, 362/330, 615, 609, 240; 257/89
See application file for complete search history.

(56) References Cited

U.S. PATENT DOCUMENTS

| | | | |
|---|---|---|---|
| 6,867,549 B2 * | 3/2005 | Cok ..................... | G09G 3/3216 315/169.3 |
| 7,133,093 B2 * | 11/2006 | Ochiai ................. | G02B 6/0068 349/38 |

(Continued)

FOREIGN PATENT DOCUMENTS

| KR | 1020130002781 A | 1/2013 |
|---|---|---|
| KR | 1020130011404 A | 1/2013 |
| KR | 1020130126396 A | 11/2013 |

*Primary Examiner* — Anh Mai
*Assistant Examiner* — Arman B Fallahkhair
(74) *Attorney, Agent, or Firm* — Cantor Colburn LLP

(57) ABSTRACT

A backlight assembly includes a plurality of first light sources configured to emit a first color, and a plurality of second light sources configured to emit a second color different from the first color, where the backlight assembly is divided in a first boundary area, a second boundary area spaced apart from the first boundary area in a first direction, and a middle area between the first boundary area and the second boundary area, and an arrangement direction of first and second light sources of the plurality of first and second light sources in the first and second boundary areas is different from an arrangement direction of first and second light sources of the plurality of first and second light sources in the middle area.

20 Claims, 14 Drawing Sheets

(56) References Cited

U.S. PATENT DOCUMENTS

| | | | | |
|---|---|---|---|---|
| 7,483,095 B2* | 1/2009 | Roth | ............... | G09G 3/3607 |
| | | | | 345/690 |
| 7,736,047 B2* | 6/2010 | Ohashi | ............. | G02B 6/0068 |
| | | | | 362/613 |
| 7,859,609 B2* | 12/2010 | Bang | ............. | G02F 1/133605 |
| | | | | 349/61 |
| 7,918,574 B2* | 4/2011 | Blümel | ........... | G02F 1/133603 |
| | | | | 362/231 |
| 2008/0024696 A1* | 1/2008 | Arai | ............... | G02B 6/0068 |
| | | | | 349/62 |
| 2009/0135592 A1* | 5/2009 | Hamada | ........... | G02F 1/133603 |
| | | | | 362/231 |
| 2010/0321418 A1* | 12/2010 | Hayashi | ........... | G02F 1/133603 |
| | | | | 345/690 |

* cited by examiner

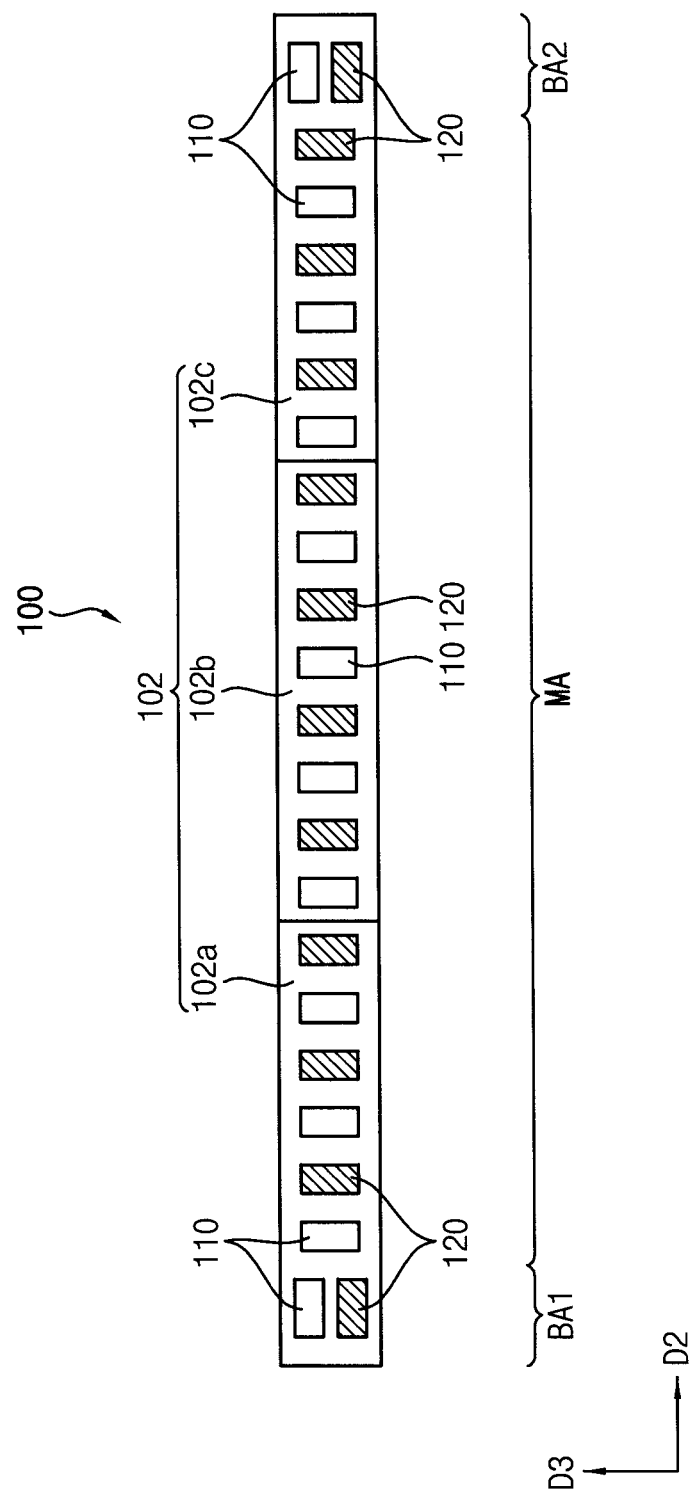

BACKLIGHT ASSEMBLY AND DISPLAY APPARATUS INCLUDING THE SAME

This application claims priority to Korean Patent Application No. 10-2013-0137512, filed on Nov. 13, 2013, and all the benefits accruing therefrom under 35 U.S.C. §119, the disclosure of which is incorporated by reference herein in its entirety.

BACKGROUND

1. Field

Exemplary embodiments of the invention relate to a backlight assembly and a display apparatus including the backlight assembly.

More particularly, exemplary embodiments of the invention relate to a backlight assembly for a liquid crystal display ("LCD") apparatus and a display apparatus including the backlight assembly.

2. Description of the Related Art

Recently, a display apparatus having light weight and small size has been manufactured. A cathode ray tube ("CRT") display apparatus has been used due to a performance and a competitive price. However, the CRT display apparatus has a weakness with a size and portability. Therefore, the liquid crystal display ("LCD") apparatus has been highly regarded due to small size, light weight and low-power-consumption of the LCD apparatus.

The LCD apparatus applies a voltage to a specific molecular arrangement configured to change the molecular arrangement. The LCD apparatus displays an image using changes of optical property (e.g., birefringence, rotatory polarization, dichroism and light scattering) of a liquid crystal cell of the LCD apparatus according to the changes of the molecular arrangement.

SUMMARY

A liquid crystal display ("LCD") apparatus includes a LCD panel and a backlight assembly to supply light to the LCD panel. When the backlight assembly includes light sources having more than two different colors, light source quality of the backlight assembly may be decreased due to color stain caused in a display area of the LCD panel.

One or more exemplary embodiment of the invention provides a backlight assembly capable of improving an exiting light quality.

One or more exemplary embodiments of the invention also provide a display apparatus having the backlight assembly.

According to an exemplary embodiment of the invention, a backlight assembly includes a plurality of first light sources configured to emit a first color, and a plurality of second light sources configured to emit a second color different from the first color. The backlight assembly is divided into a first boundary area, a second boundary area spaced apart from the first boundary area in a first direction, and a middle area between the first boundary area and the second boundary area. An arrangement direction of first and second light sources of the plurality of first and second light sources in the first and second boundary areas is different from an arrangement direction of first and second light sources of the plurality of first and second light sources in the middle area.

In an exemplary embodiment, the backlight assembly may further include a first substrate which extends in a second direction which is substantially perpendicular to the first direction, and has a width in a third direction which is substantially perpendicular to the first and second directions, and a light guiding plate adjacent to the first substrate. First and second light sources of the plurality of first and second light sources may be disposed on the first substrate.

In an exemplary embodiment, the first and second light sources in the first boundary area may be disposed adjacent to each other in the third direction. The first and second light sources in the middle area may be disposed adjacent to each other in the second direction. The first and second light sources in the second boundary area may be disposed adjacent to each other in the third direction.

In an exemplary embodiment, each of the plurality of first light sources may include a first-a light source and a first-b light source. Each of the plurality of second light sources may include a second-a light source and a second-b light source. The first-a light source and the first-b light source may be electrically connected in serial. The second-a light source and the second-b light source may be electrically connected in serial.

In an exemplary embodiment, the plurality of first light and the second light sources may receive a power voltage. The first-a light source and the first-b light source may receive first driving signal. The second-a light source and the second-b light source may receive a second driving signal which is different from the first driving signal.

In an exemplary embodiment, the first-a and second-a light sources in the first boundary area may be disposed adjacent each other in the third direction. The first-b light source and the second-b light source in the middle area may be disposed adjacent each other in the second direction.

In an exemplary embodiment, each of the plurality of first and second light sources may have a width and a length larger than the width in a plan view. Each of the plurality of first and second light sources may include a first light emitting diode ("LED") and a second LED spaced part from the first LED in a length direction of the plurality of first and second light sources.

In an exemplary embodiment, each of light source packages may include one of the plurality of first light sources and one of the plurality of second light sources. The light source packages may be arranged in the second direction on the first substrate.

In an exemplary embodiment, the backlight assembly may further include a second substrate spaced apart from the first substrate and facing the second substrate. First and second light sources of the plurality of first and second light sources may be disposed on the second substrate. The light guiding plate may be disposed between the first substrate and the second substrate.

In an exemplary embodiment, each of the first light sources of the first substrate may face a corresponding second light source among the second light sources of the second substrate. Each of the second light sources of the first substrate may face a corresponding first light source among the first light sources of the second substrate.

In an exemplary embodiment, the plurality of first and second light sources may be arranged in a matrix shape in the first and second directions.

In an exemplary embodiment, the backlight assembly may further include a first light source bar which extends in the second direction, and is disposed in the first boundary area, a second light source bar spaced apart from the first light source bar in the first direction, and disposed in the middle area, a third light source bar spaced apart from the second light source bar in the first direction, and disposed in the second boundary area, and a light source driving part electrically connected to the first to third light source bars. The first light source bar may include one of the plurality of first light sources and one of the plurality of second light sources disposed adjacent to each other in the second direction. The second light source bar may include one of the plurality of first light sources and one of the plurality of second light sources disposed adjacent to each other in the first direction. The third light source bar may include one of the plurality of first light sources and one of the plurality of second light sources disposed adjacent to each other in the second direction.

In an exemplary embodiment, first and second light sources disposed in an end of the first light source bar in the second direction may be disposed adjacent each other in a fourth direction different from the first and second directions.

In an exemplary embodiment, the backlight assembly may further include a receiving container which receives the first to third light source bars and the light source driving part, and a reflecting sheet received in the receiving container, disposed on the first to third light source bars, and openings that are defined in the reflecting sheet and expose the first and second light sources.

In an exemplary embodiment, the first color may be yellow and the second color may be blue. The first color may be magenta and the second color may be green. The first color may be cyan and the second color may be red.

In an exemplary embodiment, when the plurality of first light sources is turned on, the plurality of second light sources may be turned off. When the plurality of second light sources is in a turned-on state, the plurality of first light sources may be in a turned-off state.

According to another exemplary embodiment of the invention, a display apparatus includes a display panel displaying an image, a backlight assembly disposed under the display panel, and configured to supply light to the display panel, and a receiving container which receives the display panel and the backlight assembly. The backlight assembly includes a plurality of first light sources configured to emit a first color, and a plurality of second light sources configured to emit a second color different from the first color. The backlight assembly is divided in a first boundary area, a second boundary area spaced apart from the first boundary area in a first direction, and a middle area between the first boundary area and the second boundary area. An arrangement direction of first and second light sources of the plurality of first and second light sources in the first and second boundary areas is different from an arrangement direction of first and second light sources of the plurality of first and second light sources in the middle area.

In an exemplary embodiment, the display panel may include a first subpixel having the first color, a second subpixel having the second color and a transparent subpixel.

According to still another exemplary embodiment of the invention, the backlight assembly may further include a first substrate which extends in a second direction which is substantially perpendicular to the first direction and having a width in a third direction which is substantially perpendicular to the first and second directions, and a light guiding plate adjacent to the first substrate. First and second light sources of the plurality of first and second light sources may be disposed on the first substrate.

In an exemplary embodiment, the plurality of first and second light sources may be arranged in a matrix shape in the first and second directions. The backlight assembly may further include a first light source bar which extends in the second direction, and is disposed in the first boundary area, a second light source bar spaced apart from the first light source bar in the first direction, and disposed in the middle area, a third light source bar spaced apart from the second light source bar in the first direction, and disposed in the second boundary area, and a light source driving part electrically connected to the first to third light source bars. The first light source bar may include one of the first light source and one of the second light source disposed adjacent to each other in the second direction. The second light source bar may include one of the plurality of first light sources and one of the plurality of second light sources disposed adjacent to each other in the first direction. The third light source bar may include one of the plurality of first light sources and one of the plurality of second light sources disposed adjacent to each other in the second direction.

According to the exemplary embodiment of the invention, a backlight assembly is divided into a first boundary area, a second boundary area and a middle area, and includes a plurality of first light sources emitting a first color and a plurality of second light sources emitting a second color different from the first color. An arrangement of the first and second light sources in the first and second boundary areas and an arrangement of the first and second light sources in the middle area, so that color stain caused by the first and second light sources may be decreased.

BRIEF DESCRIPTION OF THE DRAWINGS

The above and other features of the invention will become more apparent by describing in detail exemplary embodiments thereof with reference to the accompanying drawings, in which:

FIG. 5A is a plan view illustrating an exemplary embodiment of a first light source part of a backlight assembly according to the invention;

DETAILED DESCRIPTION

Figure 1:
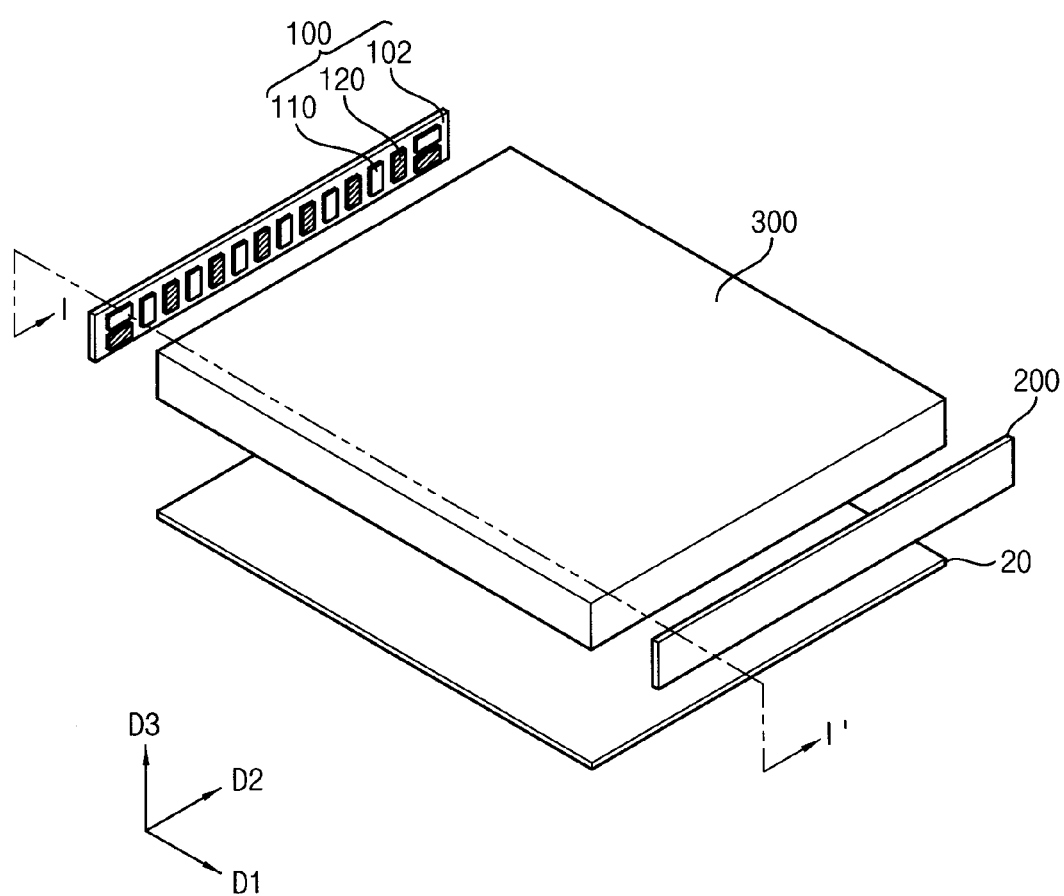
FIG. 1 is an exploded perspective view illustrating an exemplary embodiment of a backlight assembly according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is an exploded perspective view illustrating an exemplary embodiment of a backlight assembly according to the invention Referring to FIG. 1, a backlight assembly includes a first light source part 100, a second light source part 200 and a light guiding plate 300.

The first light source part 100 includes a first substrate 102, a plurality of first light sources 110 and a plurality of second light sources 120.

The first substrate 102 includes a driving circuit configured to drive the first and second light sources 110 and 120. In an exemplary embodiment, the first substrate 102 may be a printed circuit board ("PCB"), and extend in a second direction D2 substantially perpendicular to a first direction D1. The first substrate 102 has a width in a third direction which is substantially perpendicular to the first and second directions D1 and D2.

The first light sources 110 are disposed on the first substrate 102. An arrangement of the first light sources 110 will be explained in detail in FIGS. 2A to 2C. The first light sources 110 emit a first color. In an exemplary embodiment, the first color is a mixed color of a first primary color and a second primary color.

The second light sources 120 are disposed on the first substrate 102. An arrangement of the second light sources 120 will be described in detail in FIGS. 2A to 2C. In an exemplary embodiment, the second light sources 120 emit a second color. In an exemplary embodiment, the second color is a third primary color. Detailed description will be mentioned in FIGS. 12A and 12B.

The second light source part 200 is spaced apart from the first light source part 100 in a first direction D1, and faces the first light source part 100. The second light source part 200 includes a second substrate 202, a plurality of first light source 210 and a plurality of second light sources 220 (refer to FIG. 3).

The second substrate 202 is spaced apart from the first substrate 102 in the first direction D1, and faces the first substrate 102.

The first light sources 210 are disposed on the second substrate 202. In an exemplary embodiment, an arrangement of the first light sources 210 may be substantially same as or symmetric to the arrangement of the first light sources 110 of the first light source part 100. (refers to FIGS. 3 and 4) The first light source 210 emits a light having the first color.

The second light sources 220 are disposed on the second substrate 202. In an exemplary embodiment, an arrangement of the second light sources 220 may be substantially same as or symmetric to the arrangement of the second light sources 120 of the first light source part 100. (refers to FIGS. 3 and 4) The second light source 220 emits a light having the second color.

The light guiding plate 300 is disposed between the first light source part 100 and the second light source part 200. The light guiding plate 300 guides light from the first light source part 100 and the second light source part 200 to a display panel 50. (refers to FIG. 11)

The backlight assembly may further include a reflecting sheet 20.

The reflecting sheet 20 is disposed under the light guiding plate 300, so that the reflecting sheet 20 reflects light from the light guiding plate 300 toward the display panel 50.

In an exemplary embodiment, the reflecting sheet 20 may include a material which causes diffuse reflection. In an exemplary embodiment, the reflecting sheet 20 may be a reflecting sheet including polyethylene phthalate ("PET"). In addition, in an exemplary embodiment, the reflecting sheet 20 may have a white color, for example.

In addition, in an exemplary embodiment, the reflecting sheet 20 may include a material which cause mirror reflection. In an exemplary embodiment, the reflecting sheet 20 may be a reflecting sheet including silver or aluminum, for example.

Figure 2A:
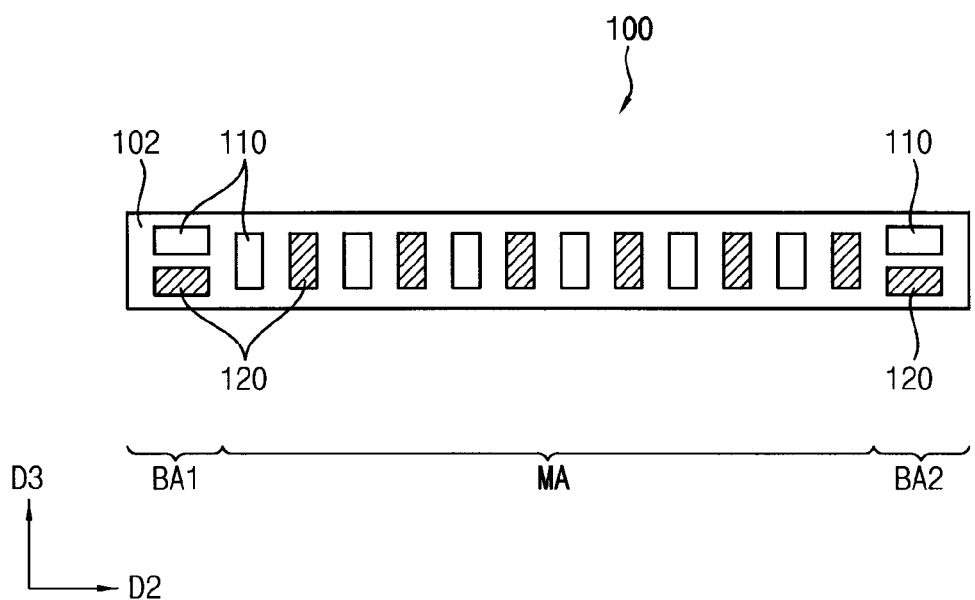
FIGS. 2A to 2C are plan views illustrating arrangement of first and second light sources of a first light source part of FIG. 1.
Figure 2B:
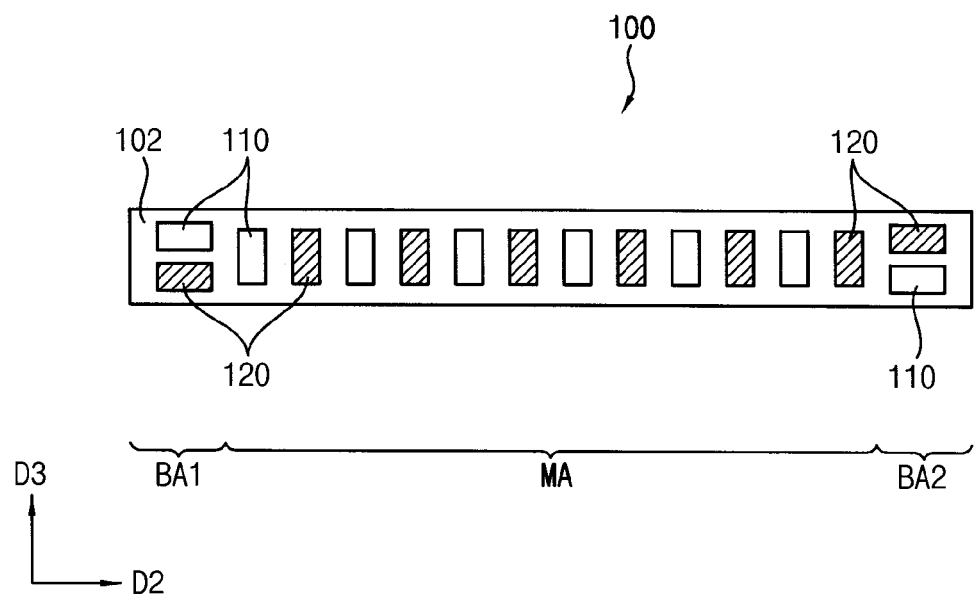
Figure 2C:
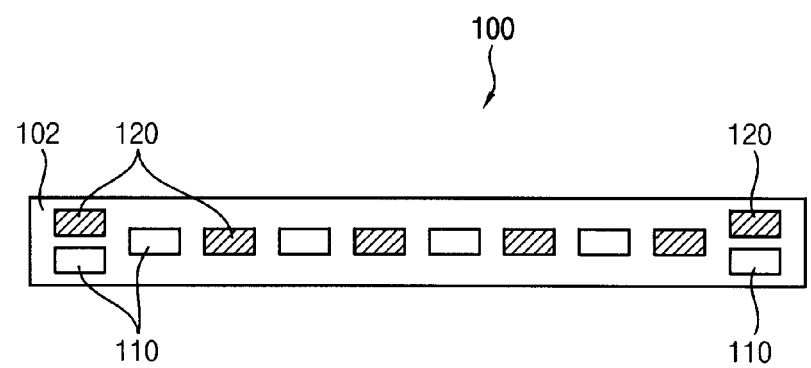
Figure 2C:
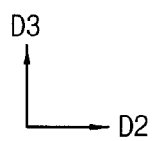

FIGS. 2A to 2C are plan views illustrating arrangement of first and second light sources of a first light source part of FIG. 1.

Referring to FIG. 2A, a first light source part 100 includes a first substrate 102, a plurality of first light sources 110 and a plurality of second light sources 120.

The first substrate 102 extends in the second direction D2. The first substrate 102 has a width in a third direction D3 which is substantially perpendicular to the second direction D2. The first light source 110 emits a light having the first color. The second light source 120 emits a light having the second color. In an exemplary embodiment, each of the first and second light sources 110 and 120 may have a rectangular shape which has a length larger than a width in a plan view. However, the invention is not limited thereto, and the first and second light sources 110 and 120 may have various other shapes.

The first light source part 100 includes a first boundary area BA1, a second boundary area BA2 and a middle area MA.

The first boundary area BA1 is disposed at an end of the first substrate 102 in the second direction D2. The second boundary area BA2 is spaced apart from the first boundary area BA1 in the second direction D2, and disposed at the other end of the first substrate 102. The middle area MA is disposed between the first boundary area BA1 and the second boundary area BA2.

One of the first light sources 110 and one of the second light sources 120 are disposed in the first boundary area BA1. The first light source 110 and the second light source 120 in the first boundary area BA1 are disposed adjacent to each other in the third direction D3. The first light source 110 in the first boundary area BA1 is disposed between a display panel 50 (refers to FIG. 10) and the second light source 120 in the first boundary area BA1. Thus, the first light source 110 and the second light source 120 in the first boundary area BA1 are disposed in the up-down direction (the third direction D3). The length of the rectangular shape of the first light source 110 and the second light source 120, which is larger than the width of the rectangular shape of the first light source 110 and the second light source 120 in a plan view, in the first boundary area BA1 may be substantially parallel to the second direction D2.

One of the first light sources 110 and one of the second light sources 120 are disposed in the second boundary area BA2. The first light source 110 and the second light source 120 in the second boundary area BA2 are disposed adjacent to each other in the third direction D3. The first light source 110 in the second boundary area BA2 is disposed between a display panel 50 (refers to FIG. 10) and the second light source 120 in the second boundary area BA2. Thus, the first light source 110 and the second light source 120 in the second boundary area BA2 are disposed in an up-down direction (i.e., the third direction D3). The length of the rectangular shape of the first light source 110 and the second light source 120 along the second direction D2 in the second boundary area BA2 may be substantially parallel to each other.

A plurality of the first light sources 110 and a plurality of the second light sources 120 are disposed in the middle area MA. The first light sources 110 and the second light sources 120 in the middle area MA are alternately disposed in the second direction D2. Thus, the first light sources 110 and the second light sources 120 in the middle area MA are disposed in a left-right direction (i.e., the second direction D2). The length of the rectangular shape of the first light source 110 and the second light source 120, which is larger than the width of the rectangular shape of the first light source 110 and the second light source 120 in a plan view, in the middle area MA may be substantially parallel to the third direction D3.

The first light source 110 and the second light source 120 are disposed in the up-down direction in the first and second boundary areas BA1 and BA2. Accordingly, a color stain caused by the first and second light sources 110 and 120 which emit different colors may be decreased. Thus, comparing with a case that the first and second light sources in the whole first light source part are disposed in the left-right direction, the color stain in the first and second boundary areas BA1 and BA2 which are boundaries of the first light source part 100 in the illustrated exemplary embodiment may be decreased.

Referring to FIG. 2B, a first light source part 100 includes a first substrate 102, a plurality of first light sources 110 and a plurality of second light sources 120. An arrangement of the first and second light sources of the first light source part 100 is substantially same as that of FIG. 2A, except for an arrangement in a second boundary area BA2. Thus, any further detailed descriptions concerning the same elements will be briefly described or be omitted.

The first light source part 100 includes a first boundary area BA1, a second boundary area BA2 and a middle area MA.

One of the first light sources 110 and one of the second light sources 120 are disposed in the first boundary area BA1. The first light source 110 and the second light source 120 in the first boundary area BA1 are disposed adjacent to each other in the third direction D3. The first light source 110 in the first boundary area BA1 is disposed between a display panel 50 (refers to FIG. 10) and the second light source 120 in the first boundary area BA1. Thus, the first light source 110 and the second light source 120 in the first boundary area BA1 are disposed in the up-down direction (i.e., the third direction D3). The length of the rectangular shape of the first light source 110 and the second light source 120, which is larger than the width of the rectangular shape of the first light source 110 and the second light source 120 in a plan view, in the first boundary area BA1 may be substantially parallel to the second direction D2.

One of the first light sources 110 and one of the second light sources 120 are disposed in the second boundary area BA2. The first light source 110 and the second light source 120 in the second boundary area BA2 are disposed adjacent to each other in the third direction D3. The second light source 120 in the second boundary area BA2 is disposed between a display panel 50 (refers to FIG. 10) and the first light source 110 in the second boundary area BA2. Thus, the second light source 120 and the first light source 110 in the second boundary area BA2 are disposed in the up-down direction (i.e., the third direction D3). The length of the rectangular shape of the first light source 110 and the second light source 120, which is larger than the width of the rectangular shape of the first light source 110 and the second light source 120 in a plan view, in the second boundary area BA2 may be substantially parallel to the second direction D2. Accordingly, an arrangement of the first and second light sources 110 and 120 in the second boundary area BA2 is symmetric to an arrangement of the first and second light sources 110 and 120 in the first boundary area BA1.

A plurality of the first light sources 110 and a plurality of the second light sources 120 are disposed in the middle area MA. The first light sources 110 and the second light sources 120 in the middle area MA are alternately disposed in the second direction D2. Thus, the first light sources 110 and the second light sources 120 in the middle area MA are disposed in the left-right direction (the second direction D2). The length of the rectangular shape of the first light source 110 and the second light source 120, which is larger than the width of the rectangular shape of the first light source 110 and the second light source 120 in a plan view, in the middle area MA may be substantially parallel to the third direction D3.

Referring to FIG. 2C, a first light source part 100 includes a first substrate 102, a plurality of first light sources 110 and a plurality of second light sources 120. The first light source part 100 is substantially same as the first light source part 100 in FIG. 2A except for an arrangement of the first and second light sources 110 and 120. Thus, any further detailed descriptions concerning the same elements will be briefly described or be omitted.

The first light source part 100 includes a first boundary area BA1, a second boundary area BA2 and a middle area MA.

One of the first light sources 110 and one of the second light sources 120 are disposed in the first boundary area BA1. The first light source 110 and the second light source 120 in the first boundary area BA1 are disposed adjacent to each other in the third direction D3. The second light source 120 in the first boundary area BA1 is disposed between a display panel 50 (refers to FIG. 10) and the first light source 110 in the first boundary area BA1. Thus, the first light source 110 and the second light source 120 in the first boundary area BA1 are disposed in the up-down direction (the third direction D3). The length of the rectangular shape of the first light source 110 and the second light source 120, which is larger than the width of the rectangular shape of the first light source 110 and the second light source 120 in a plan view, in the first boundary area BA1 may be substantially parallel to the second direction D2.

One of the first light sources 110 and one of the second light sources 120 are disposed in the second boundary area BA2. The first light source 110 and the second light source 120 in the second boundary area BA2 are disposed adjacent to each other in the third direction D3. The second light source 120 in the second boundary area BA2 is disposed between a display panel 50 (refers to FIG. 10) and the first light source 110 in the second boundary area BA2. Thus, the first light source 110 and the second light source 120 in the second boundary area BA2 are disposed in the up-down direction (the third direction D3). The length of the rectangular shape of the first light source 110 and the second light source 120, which is larger than the width of the rectangular shape of the first light source 110 and the second light source 120 in a plan view, in the second boundary area BA2 may be in parallel with the second direction D2.

A plurality of the first light sources 110 and a plurality of the second light sources 120 are disposed in the middle area MA. The first light sources 110 and the second light sources 120 in the middle area MA are alternately disposed in the second direction D2. Thus, the first light sources 110 and the second light sources 120 in the middle area MA are disposed in the left-right direction (the second direction D2). The length of the rectangular shape of the first light source 110 and the second light source 120, which is larger than the width of the rectangular shape of the first light source 110 and the second light source 120 in a plan view, in the middle area MA may be substantially parallel to the second direction D2.

Figure 3:
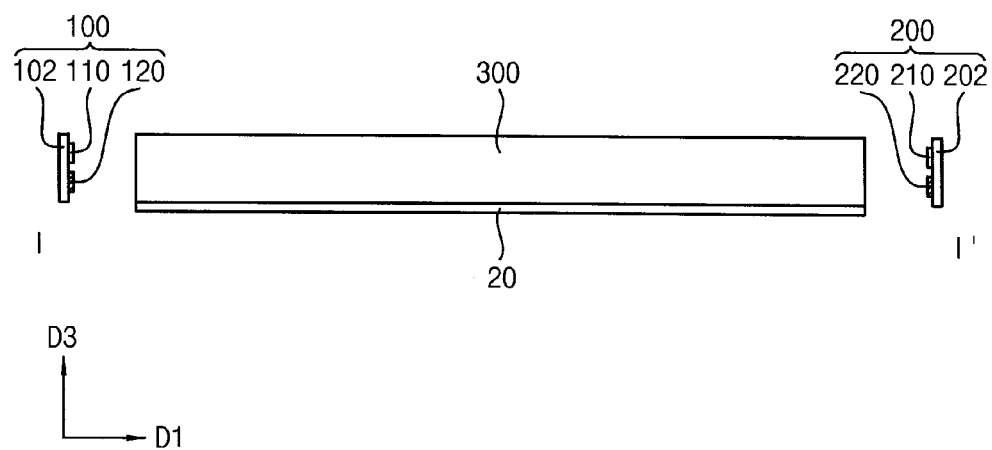
FIG. 3 is a cross-sectional view taken along line I-I' of FIG. 1.

FIG. 3 is a cross-sectional view taken along line I-I' of FIG. 1.

Referring to FIGS. 1 and 3, a backlight assembly includes a first light source part 100, a second light source part 200, a light guiding plate 300 and a reflecting sheet 20.

The first light source part 100 includes a first substrate 102, a plurality of first light sources 110 and a plurality of second light sources 120. The second light source part 200 includes a second substrate 202, a plurality of first light source 210 and a plurality of second light sources 220. The second light source part 200 is spaced apart from the first light source part 100 in a first direction D1, and faces the first light source part 100. The light guiding plate 300 and the reflecting sheet 20 disposed under the light guiding plate 300 are disposed between the first light source part 100 and the second light source part 200.

The first light source 110 of first light source part 100 faces the first light source 210 of the second light source part 200. Thus, the first light source 110 of the first light source part 100 and the first light source 210 of the second light source part 200 are disposed corresponding to each other in the first direction D1.

The second light source 120 of the first light source part 100 faces the second light source 220 of the second light source part 200. Thus, the second light source 120 of the first light source part 100 and the second light source 220 of the second light source part 200 are disposed corresponding to each other in the first direction D1.

Figure 4:
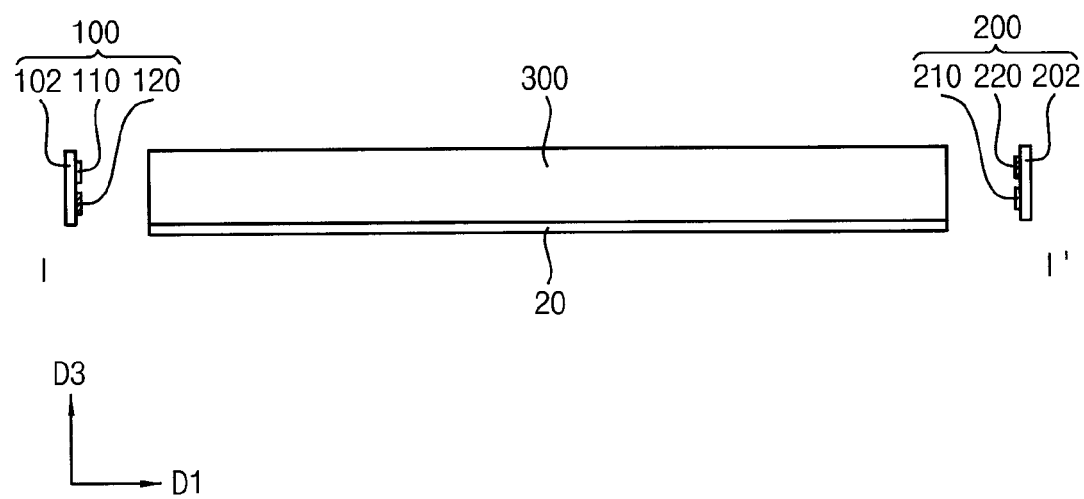
FIG. 4 is a cross-sectional view illustrating another exemplary embodiment of a backlight assembly according to the invention.

FIG. 4 is a cross-sectional view illustrating another exemplary embodiment of a backlight assembly according to the invention.

Referring to FIGS. 1 and 4, a backlight assembly includes a first light source part 100, a second light source part 200, a light guiding plate 300 and a reflecting sheet 20.

The first light source part 100 includes a first substrate 102, a plurality of first light sources 110 and a plurality of second light sources 120. The second light source part 200 includes a second substrate 202, a plurality of first light source 210 and a plurality of second light sources 220. The second light source part 200 is spaced apart from the first light source part 100 in a first direction D1, and faces the first light source part 100. The light guiding plate 300 and the reflecting sheet 20 disposed under the light guiding plate 300 are disposed between the first light source part 100 and the second light source part 200.

The first light source 110 of first light source part 100 faces the second light source 220 of the second light source part 200. Thus, the first light source 110 of the first light source part 100 and the second light source 220 of the second light source part 200 are disposed corresponding to each other in the first direction D1.

The second light source 120 of the first light source part 100 faces the first light source 210 of the second light source part 200. Thus, the second light source 120 of the first light source part 100 and the first light source 210 of the second light source part 200 are disposed corresponding to each other in the first direction D1.

Figure 5B:
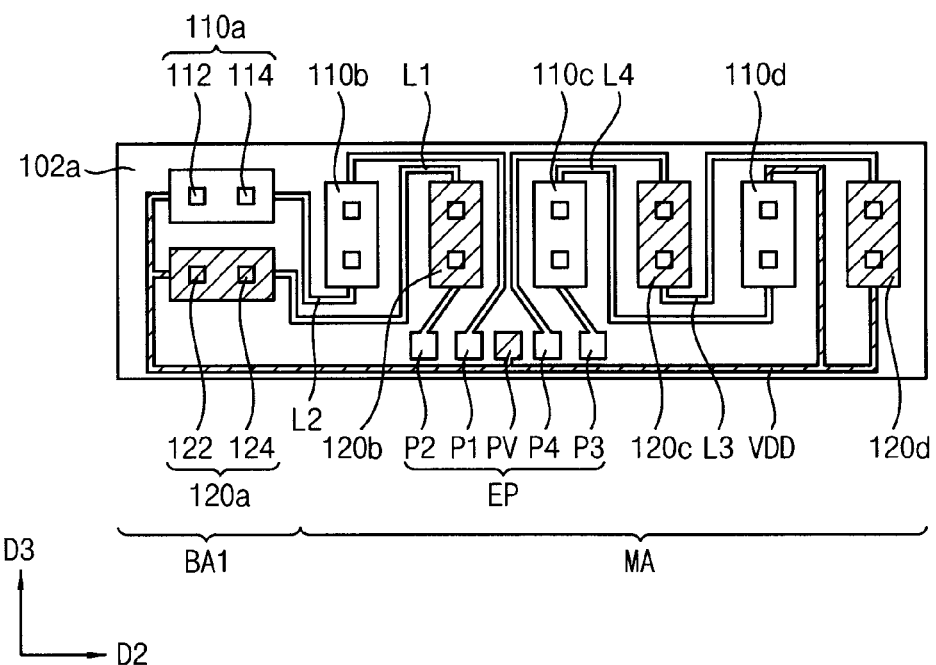
FIG. 5B is an enlarged plan view illustrating a first portion of the first light source part of FIG. 5A.

FIG. 5A is a plan view illustrating an exemplary embodiment of a first light source part of a backlight assembly according to the invention. FIG. 5B is an enlarged plan view illustrating a first portion of the first light source part of FIG. 5A.

Referring to FIGS. 5A and 5B, a first light source part 100 of a backlight assembly includes a first boundary area BA1, a second boundary area BA2 spaced apart from the first boundary area BA1 in a second direction D2 and a middle area MA between the first boundary area BA1 and the second boundary area BA2.

The first light source part 100 includes a first substrate 102, a plurality of first light sources 110 and a plurality of second light sources 120.

The first substrate 102 is divided into a first portion 102a, a second portion 102b and a third portion 102c. In an exemplary embodiment, the first portion 102a, the second portion 102b and the third portion 102c may be physically separated and distinct substrates. In addition, in an exemplary embodiment, the first portion 102a, the second portion 102b and the third portion 102c may be separated driving parts which are driven by distinct driving circuits, respectively.

The first portion 102a includes the first boundary area BA1 and a portion of the middle area MA. A first-a light source 110a, a second-a light source 120a are disposed in the first boundary area BA1. The first-a light source 110a and the second-a light source 120a are disposed adjacent to each other in a third direction D3. Thus, the first-a light source 110a and the second-a light source 120a are disposed in the up-down direction (the third direction D3). Each of the first-a light source 110a and the second-a light source 120a may have a rectangular shape which has a length larger than a width. The length of the rectangular shape may be substantially parallel to the second direction D2.

A first-b light source 110b, a first-c light source 110c, a first-d light source 110d and a second-b light source 120b, a second-c light source 120c, and a second-d light source 120d are disposed in the portion of the middle area MA. In the illustrated exemplary embodiment, the first-b light source 110b, the second-b light source 120b, the first-c light source 110c, the second-c light source 120c, the first-d light source 110d and the second-d light source 120d are arranged in order along the second direction D2. Each of the first-b, first-c and first-d light sources 110b, 110c, and 110d and the second-b, second-c and second-d light sources 120b, 120c and 120d may have a rectangular shape which has a length larger than a width. The length of the rectangular shape may be substantially parallel to the third direction D3.

Referring again to FIG. 5B, the first-a light source 110a and the first-b light source 110b are connected in serial. The second-a light source 120a and second-b light source 120b are connected in serial. The first-c light source 110c and the first-d light source 110d are connected in serial. The second-c light source 120c and the second-d light source 120d are connected in serial.

In an exemplary embodiment, the first-a light source 110a and the first-b light source 110b may be electrically connected though the second wiring L2, for example. The first-a light source 110a may be electrically connected to the power wiring VDD. The first-b light source 110b may be electrically connected to a first pad P1.

The second-a light source 120a and the second-b light source 120b may be electrically connected though the first wiring L1. The second-a light source 120a may be electrically connected to the power wiring VDD. The second-b light source 120b may be electrically connected to a second pad P2.

The first-c light source 110c and the first-d light source 110d may be electrically connected though the fourth wiring L4. The first-d light source 110d may be electrically connected to the power wiring VDD. The first-c light source 110c may be electrically connected to a third pad P3.

The second-c light source 120c and the second-d light source 120d may be electrically connected though the third wiring L3. The second-d light source 120d may be electrically connected to the power wiring VDD. The second-c light source 120c may be electrically connected to a fourth pad P4.

The power wiring VDD is electrically connected to a power pad PV. The first to fourth pads P1, P2, P3 and P4 and the power pad PV are included in an electrode pad part EP. The electrode pad part EP is electrically connected to a light driving part (not shown), so that a driving signal from the light driving part may be applied to the electrode pad part EP. In an exemplary embodiment, a power voltage is applied to the power pad PV, a first driving signal is applied to the first pad P1, a second driving signal is applied to the second pad P2, a third driving signal is applied to the third pad P3, and the fourth driving signal is applied to the fourth pad P4, for example. In an exemplary embodiment, the first driving signal and the third driving signal may be substantially same each other. In an exemplary embodiment, the second driving signal and the fourth driving signal may be substantially same each other.

In an exemplary embodiment, a voltage applied to the first-a and second-a light sources 110a and 120a may be lower than a voltage applied to the first-c and first-d light sources 110c and 110d, so that brightness of the first-a and second-a light sources 110a and 120a in the first boundary area BA1 may be lower than that of the first-c and first-d light sources 110c and 110d in the middle area MA. Accordingly, although density of the first light sources 110 in the first boundary area BA1 is greater than that in the middle area MA, uniform brightness through the whole area may be obtained.

The second portion 102b includes a portion of a middle area MA. Four of the first light sources 110 and four of second light sources 120 are disposed in the second portion 102b. The first light sources 110 and the second light sources 120 in the second portion 102b are alternately arranged.

The third portion 102c includes a second boundary area BA2 and a portion of the middle area MA. One of the first light sources 110 and one of the second light sources 120 are disposed in the second boundary area BA2. Three of the first light sources 110 and three of the second light sources 120 are alternately disposed in the portion of the middle area MA along the second direction D2. The third portion 102c is symmetric to the first portion 102a.

Thus, in the exemplary embodiment the first and second light sources 110 and 120 of the first substrate 102 are divided into a plurality of portions, each of the portions has eight of the first and second light sources, and each of the portions is separately driven.

The first light source 110 includes a first light emitting diode ("LED") 112 and a second LED 114 which are arranged in a direction substantially parallel to the length of the rectangular shape. In an exemplary embodiment, the first light source 110 may include a fluorescent layer (not shown). The first LED 112 and the second LED 114 may emit light having proper colors, so that the first light source 110 may generate the first color.

The second light source 120 includes a first LED 122 and a second LED 124 which are arranged in a direction substantially parallel to the length of the rectangular shape. In an exemplary embodiment, the second light source 120 may include a fluorescent layer (not shown). The first LED 122 and the second LED 124 may emit light having proper colors, so that the second light source 120 may generate the second color.

Figure 6:
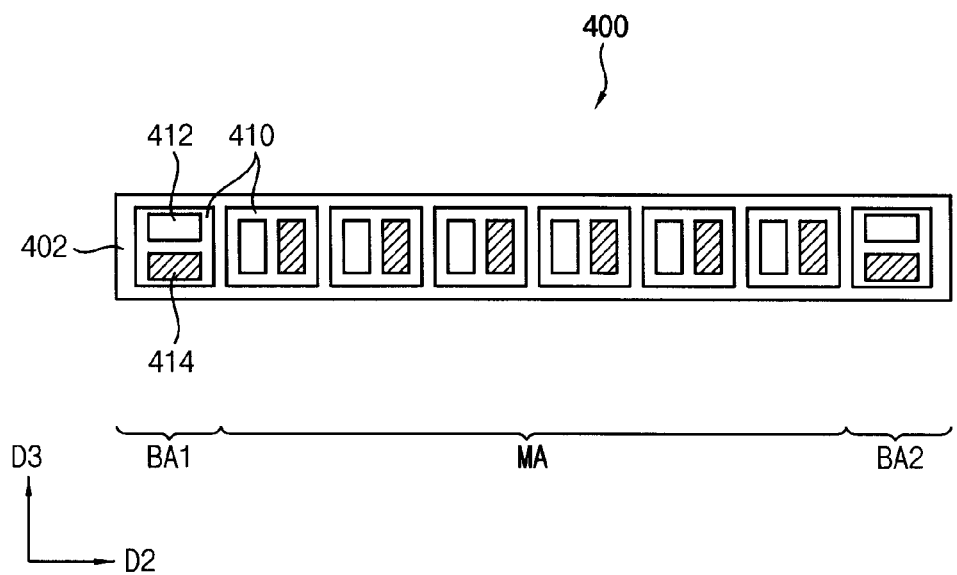
FIG. 6 is a plan view illustrating another exemplary embodiment of a first light source part of a backlight assembly according to the invention.

FIG. 6 is a plan view illustrating another exemplary embodiment of a first light source part of a backlight assembly according to the invention.

Referring to FIG. 6, a first light source part 400 includes a first substrate 402, a plurality of light source units 410. The light source unit 410 includes a first light source 412 and a second light source 414. In an exemplary embodiment, the light source unit 410 may be a single light source package having the first and second light sources 412 and 414. The first light sources 412 and the second light source 414 may be substantially same as the first light source 110 and the second light source 120 of FIG. 1, respectively.

The first substrate 402 extends in a second direction D2. The first substrate 402 has a width in a third direction D3 which is substantially perpendicular to the second direction D2. The light source units 410 are arranged in the second direction D2.

The first light source part 400 includes a first boundary area BA1, a second boundary area BA2 spaced apart from the first boundary area BA1 in the second direction D2 and a middle area MA between the first boundary area BA1 and the second boundary area BA2.

One of the light source units 410 is disposed in the first boundary area BA1. The first and second light sources 412 and 414 of the light source units 410 in the first boundary area BA1 are disposed adjacent each other in the third direction D3.

One of the light source units 410 is disposed in the second boundary area BA2. The first and second light sources 412 and 414 of the light source units 410 in the second boundary area BA2 are disposed adjacent each other in the third direction D3.

A plurality of the light source units 410 are arranged in the middle area MA along the second direction D2. The first and second light sources 412 and 414 of each of the light source units 410 are adjacent each other in the second direction D2.

Figure 7:
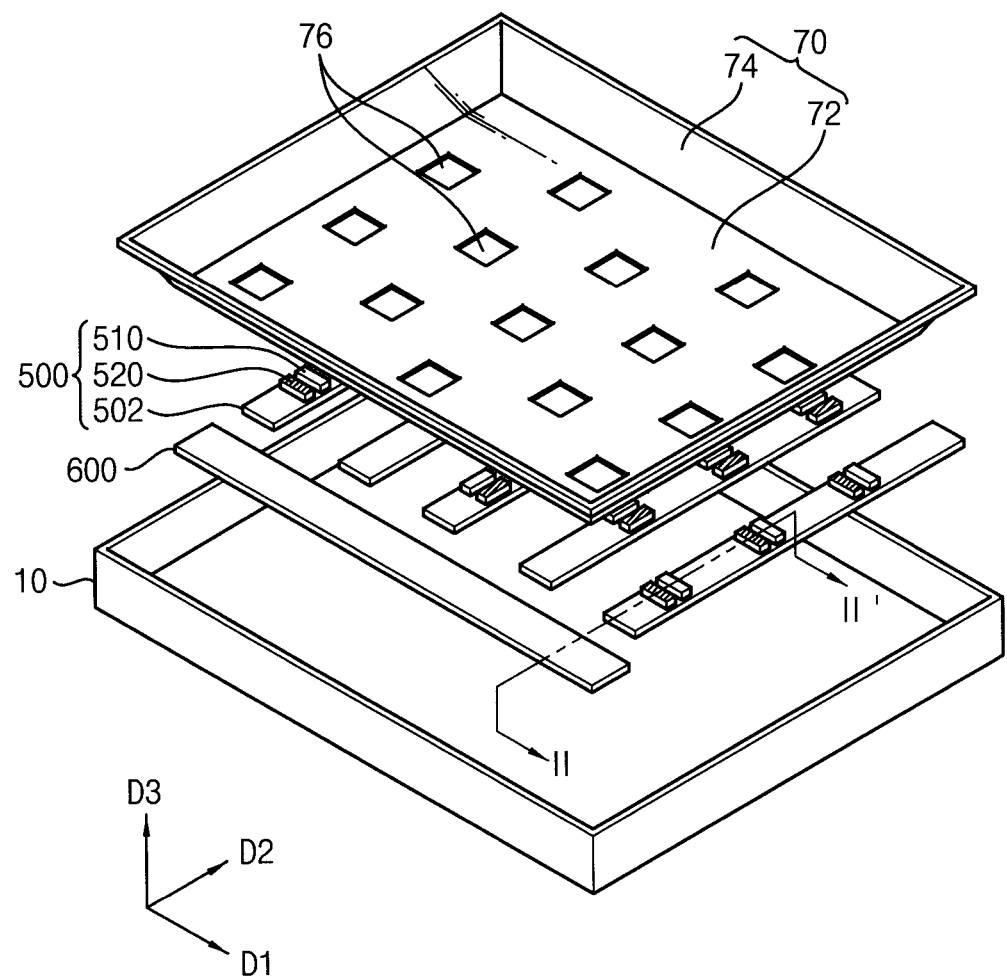
FIG. 7 is an exploded perspective view illustrating another exemplary embodiment of a backlight assembly according to the invention.
Figure 8:
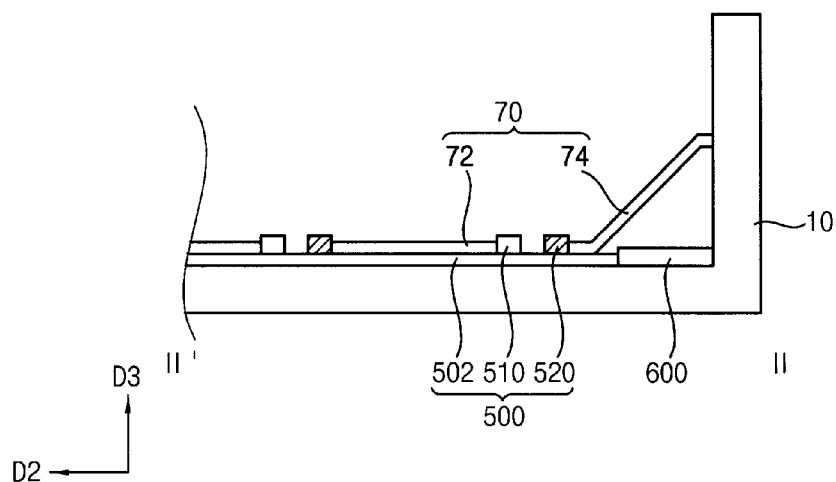
FIG. 8 is a cross-sectional view taken along line II-II' of FIG. 7.

FIG. 7 is an exploded perspective view illustrating another exemplary embodiment of a backlight assembly according to the invention. FIG. 8 is a cross-sectional view taken along line II-II' of FIG. 7.

Referring to FIGS. 7 and 8, a backlight assembly includes a receiving container 10, a plurality of light source bars 500, a light source driving part 600 and a reflecting sheet 70.

The bottom chassis 10 receives the light source bars 500, the light source driving part 600 and the reflecting sheet 70.

The light source bars 500 are arranged in the first direction D1, and extend in the second direction D2 which is substantially perpendicular to the first direction D1. Each of the light source bars 500 includes a substrate 502, a plurality of first light sources 510 and a plurality of second light sources 520.

The first light sources 510 are disposed on the substrate 502. An arrangement of the first light sources 510 will be described in detail in FIGS. 9A to 9C. The first light sources 510 emit a first color. In an exemplary embodiment, the first color may be a mixed color of a first primary color and a second primary color.

The second light sources 520 are disposed on the substrate 502. An arrangement of the second light sources 520 will be described in detail in FIGS. 9A to 9C. The second light sources 520 emit a second color. In an exemplary embodiment, the second color may be a third primary color. Detailed description will be mentioned in FIGS. 12A and 12B.

The light source driving part 600 extends in the first direction D1, and is electrically connected to the light source bars 500. In an exemplary embodiment, the light source bar 500 may be electrically connected to the light source driving part 600 through a connector (not shown) of the light source driving part 600, for example. The light source driving part 600 generates a driving signal to drive the first and second light sources 510 and 520 of the light source bars 500, and apply the driving signal to the light source bars 500.

The reflecting sheet 70 is disposed on the light source bars 500 and the light source driving part 600. The reflecting sheet 70 includes a bottom portion 72 and an inclined portion 74. The bottom portion 72 is substantially parallel to a plane on which the first and second light sources 510 and 520 are disposed. The inclined portion 74 extends from a boundary of the bottom portion 72, and inclined in a third direction D3 which is substantially perpendicular to the first and second directions D1 and D2 with a tilted angle. Accordingly, a space is defined between the inclined portion 74 and the receiving container 10, so that the light source driving part 600 and the light source bars 500 may be disposed in the space.

A plurality of openings 76 corresponding to the first and second light sources 510 and 520 is defined through the bottom portion 72 of the reflecting sheet 70. The openings 76 expose the first and second light sources 510 and 520.

Figure 9A:
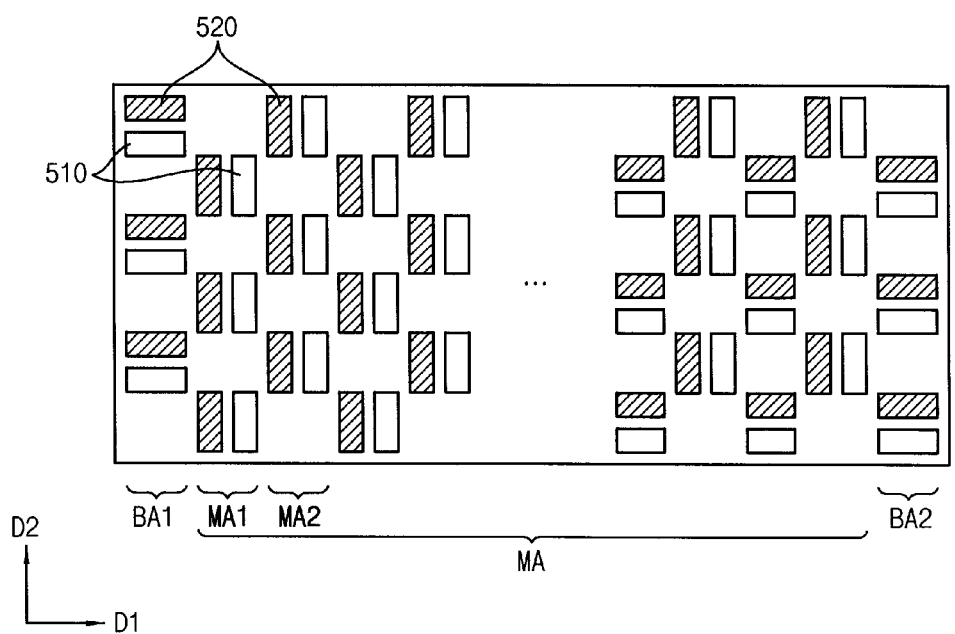
FIGS. 9A and 9B are plan views illustrating various arrangements of first and second light sources of FIG. 8.
Figure 9B:
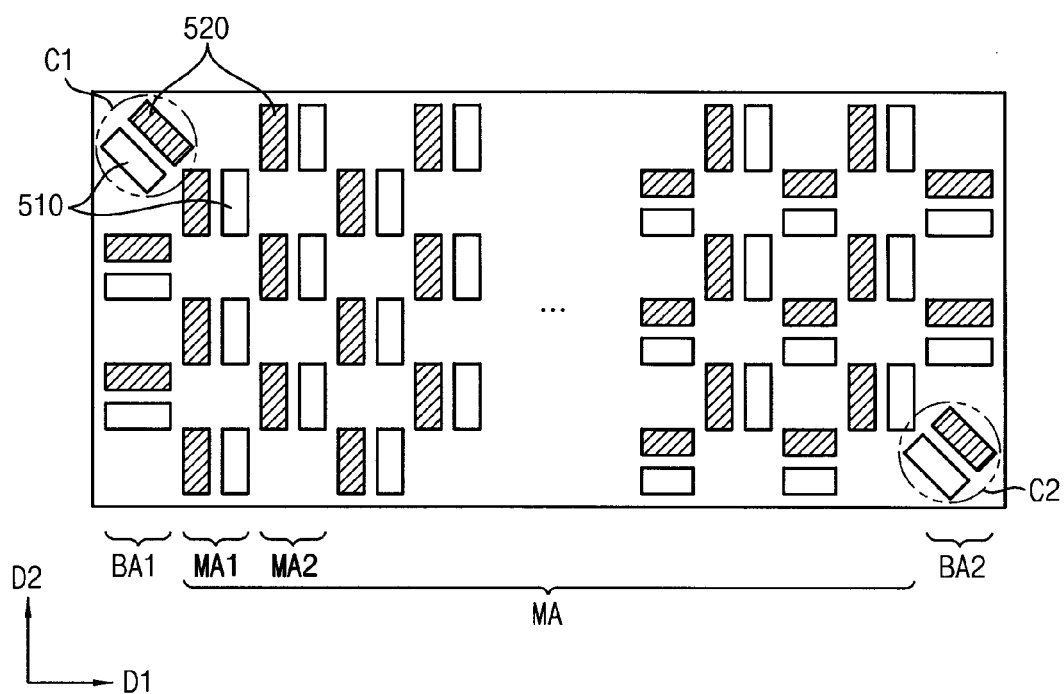

FIGS. 9A and 9B are plan views illustrating various arrangements of the first and second light sources 510 and 520 of FIG. 8.

Referring to FIG. 9A, a backlight assembly includes a first boundary area BA1, a second boundary area BA2 spaced apart from the first boundary area BA1 in a first direction D1, and a middle area MA between the first boundary area BA1 and the second boundary area BA2. The middle area MA includes a plurality of columns. In an exemplary embodiment, the middle area MA may include a first middle area MA1 and a second middle area MA2, for example.

The first boundary area BA1 extends in a second direction D2 which is substantially perpendicular to the first direction D1. The second boundary area BA2 is spaced apart from the first boundary area BA1 in the first direction D1. The second boundary area BA2 extends in the second direction D2.

The first middle area MA1 is adjacent to the first boundary area BA1 in the first direction D1, and extends in the second direction D2. The second middle area MA2 is adjacent to the first middle area MA1 in the first direction D1, and extends in the second direction D2.

A plurality of the first light sources 510 and a plurality of second light sources 520 are disposed in the first boundary area BA1. The first light sources 510 and the second light sources 520 in the first boundary area BA1 are alternately disposed in the second direction D2. The first and second light sources 510 and 520 in the first boundary area BA1 are disposed adjacent to each other in the second direction D2. Each of the first and second light sources 510 and 520 in the first boundary area BA1 may have a rectangular shape which has a length larger than a width in a plan view. The length of the rectangular shape of the first and second light source 510 and 520 in the first boundary area BA1 may be substantially parallel to the first direction D1.

A plurality of the first light sources 510 and a plurality of second light sources 520 are disposed in the second boundary area BA2. The first light sources 510 and the second light sources 520 in the second boundary area BA2 are alternately disposed in the second direction D2. The first and second light sources 510 and 520 in the second boundary area BA2 are disposed adjacent to each other in the second direction D2. Each of the first and second light sources 510 and 520 in the second boundary area BA2 may have a rectangular shape which has a length larger than a width in a plan view. The length of the rectangular shape of the first and second light source 510 and 520 in the second boundary area BA2 may be substantially parallel to the first direction D1.

A plurality of the first light sources 510 and a plurality of second light sources 520 are disposed in the first middle area MA1. The first light sources 510 and the second light sources 520 in the first middle area MA1 are disposed in the second direction D2. The first and second light sources 510 and 520 in the first middle area MA1 are disposed adjacent to each other in the first direction D1. Each of the first and second light sources 510 and 520 in the first middle area MA1 may have a rectangular shape which has a length larger than a width in a plan view. The length of the rectangular shape of the first and second light source 510 and 520 in the first middle area MA1 may be substantially parallel to the second direction D2.

A plurality of the first light sources 510 and a plurality of second light sources 520 are disposed in the second middle area MA2. The first light sources 510 and the second light sources 520 in the second middle area MA2 are disposed in the second direction D2. The first and second light sources 510 and 520 in the second middle area MA2 are disposed adjacent to each other in the first direction D1. Each of the first and second light sources 510 and 520 in the second middle area MA2 may have a rectangular shape which has a length larger than a width in a plan view. The length of the rectangular shape of the first and second light source 510 and 520 in the second middle area MA2 may be substantially parallel to the second direction D2.

The first and second light sources 510 and 520 in the second middle area MA2 are disposed misaligned with the first and second light sources 510 and 520 in the first middle area MA1. Thus, the first and second light sources 510 and 520 in the second middle area MA2 are disposed in a same row of the first and second light sources 510 and 520 in the first boundary area BA1. The first and second light sources 510 and 520 in the first middle area MA1 are disposed in a same row of the first and second light sources 510 and 520 in the second boundary area BA2.

An arrangement direction in the first and second boundary areas BA1 and BA2 is different form that in the middle area MA. Accordingly, a color stain in a boundary area of the backlight assembly caused by the first and second light sources 510 and 520 which emit different colors may be decreased.

Referring to FIG. 9B, a backlight assembly includes a first boundary area BA1, a second boundary area BA2 spaced apart from the first boundary area BA1 in a first direction D1, and a middle area MA between the first boundary area BA1 and the second boundary area BA2. The middle area MA includes a plurality of columns. In an exemplary embodiment, the middle area MA may include a first middle area MA1 and a second middle area MA2, for example.

An arrangement of the first light sources 510 and the second light sources 520 are substantially same as that in FIG. 9A except for an arrangement in first and second corner portions C1 and C2. Thus, any further detailed descriptions concerning the same elements will be briefly described or be omitted.

One of the first light sources 510 and one of the second light sources 520 in the first corner portion C1 are spaced apart from each other in a direction different from first and second directions D1 and D2. That is, the first light sources 510 and the second light sources 520 in the first corner portion C1 are arranged with a tilted angle with reference to the first and second directions D1 and D2. The first corner portion C1 is disposed at an end of the first boundary area BA1 in the second direction D2. In the illustrated exemplary embodiment, the first corner portion C1 may be disposed at a top portion of the first boundary area BA1 in a plan view. One of the first light sources 510 and one of the second light sources 520 in the second corner portion C2 are spaced apart from each other in a direction different from the first and second directions D1 and D2. The second corner portion C2 is disposed at an end of the second boundary area BA2 in the second direction D2. In the illustrated exemplary embodiment, the first corner portion C1 may be disposed at a bottom portion of the second boundary area BA2 in a plan view. Accordingly, in the illustrated exemplary embodiment, the first and second light sources 510 and 520 in the first and second corner portions C1 and C2 are disposed in symmetric with respect to a center of the backlight assembly.

The first and second light sources 510 and 520 in the first and second corner portions C1 and C2 are arranged in the direction different from that of the other light sources, so that color stain in a boundary of the backlight assembly may be decreased.

Figure 10:
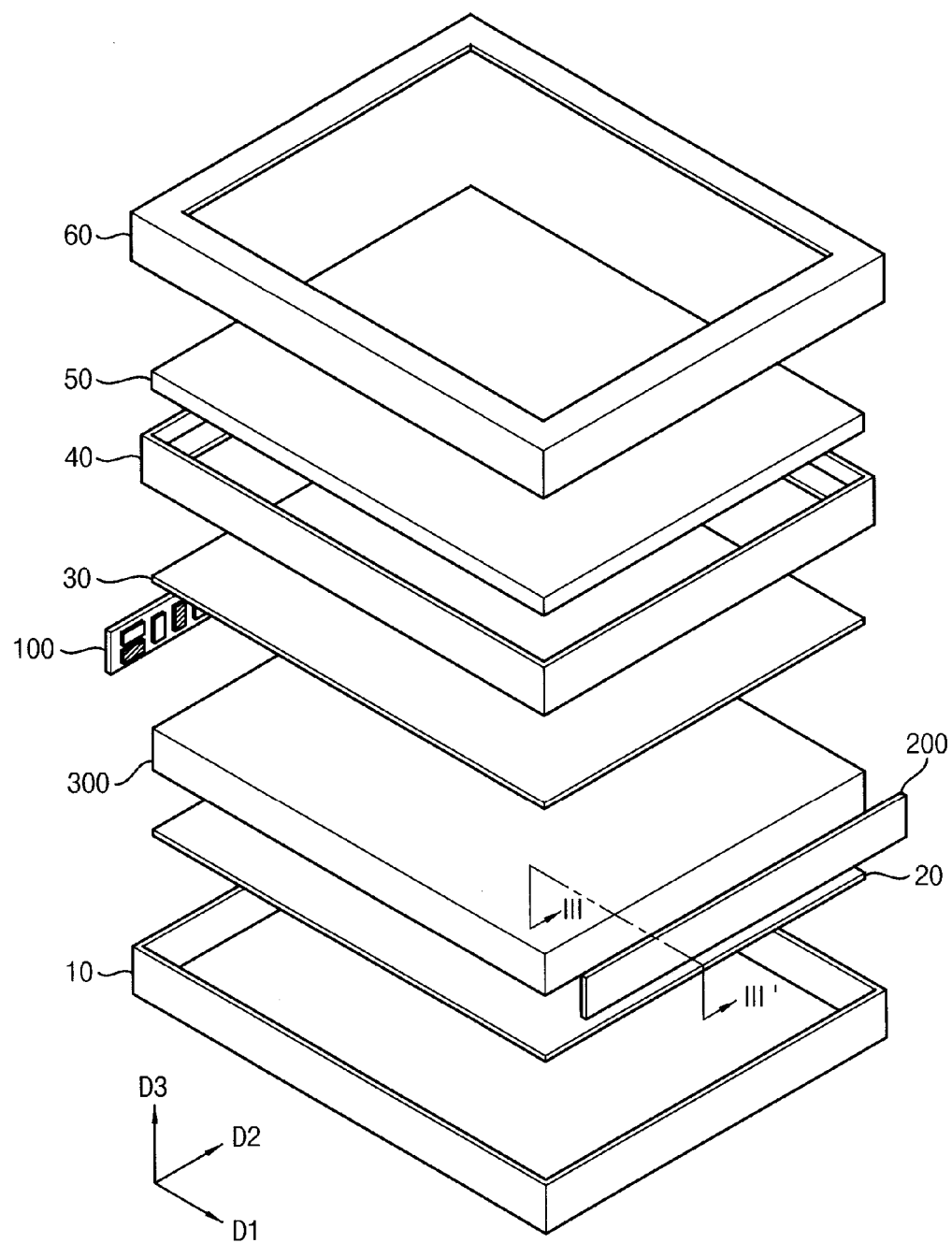
FIG. 10 is an exploded perspective view illustrating an exemplary embodiment of a display apparatus according to the invention.
Figure 11:
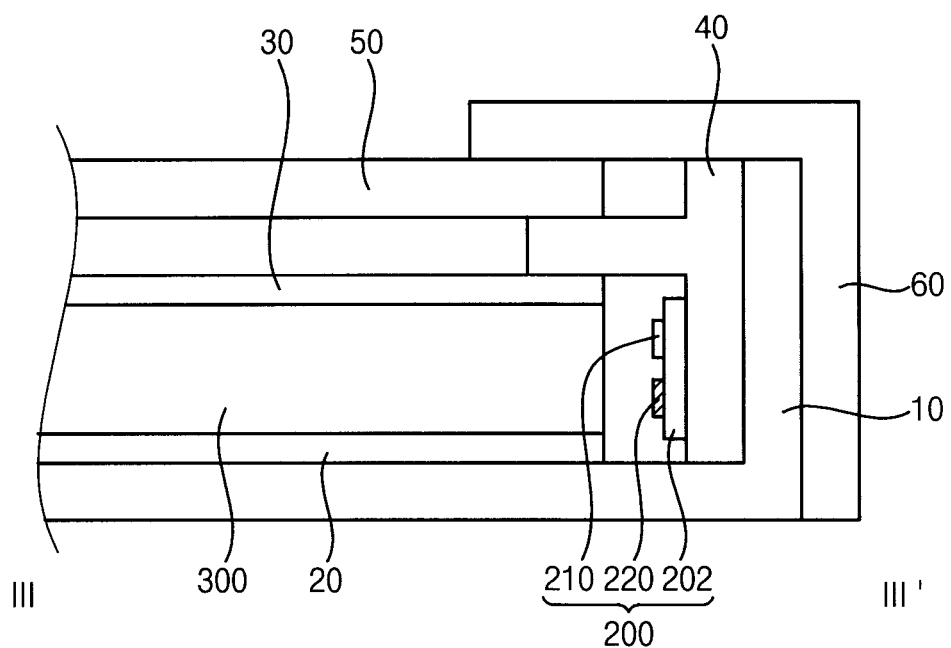
FIG. 11 is a cross-sectional view taken along line III-III' of FIG. 10.

FIG. 10 is an exploded perspective view illustrating an exemplary embodiment of a display apparatus according to the invention. FIG. 11 is a cross-sectional view taken along line III-III' of FIG. 10.

Referring to FIGS. 10 and 11, a display apparatus includes a receiving container, a backlight assembly, an optical element 30, a mold frame 40 and a display panel 50. The backlight assembly includes a first light source part 100, a second light source part 200, a light guiding plate 300 and a reflecting sheet 20. The first light source part 100 includes a first substrate 102, a first light source 110 and a second light source 120. The second light source part 200 includes a second substrate, a first light source and a second light source. The receiving container includes a bottom chassis 10 and a top chassis 60.

The bottom chassis 10 and the top chassis 60 receive the backlight assembly, the optical element 30, the mold frame 40 and the display panel 50.

The backlight assembly is substantially same as a backlight assembly of FIG. 1. Thus, any further detailed descriptions concerning the same elements will be omitted.

The optical element 30 is disposed between the display panel 50 and the light guiding plate 300. The optical elements 30 may improve optical property of the light from the light guiding plate 300. Thus, the optical element 30 may make brightness of the light from the light guiding plate 300 be uniform. The optical element 30 may include plurality of optical sheets. In an exemplary embodiment, optical element 30 may include a protecting sheet, a prism sheet and a diffusion sheet, for example. In an exemplary embodiment, the diffusion sheet may be disposed on a light exiting surface of the light guiding plate 300. In an exemplary embodiment, the prism sheet may be disposed on the diffusion sheet. The protecting sheet may be disposed on the prism sheet. In an exemplary embodiment, the prism sheet may include an upper prism sheet and a lower prism sheet. In an exemplary embodiment, an axis of the upper prism sheet may be substantially perpendicular to an axis of the lower prism sheet. However, the invention is not limited thereto, and many modifications of the optical sheet may be possible.

The mold frame 40 supports the display panel 50, the optical element 30, the first light source part 100, the second light source part 200, the light guiding plate 300, and the reflecting sheet 20 to be fixed in the receiving container. In an exemplary embodiment, the mold frame 40 may include an elastic material.

The display panel 50 includes a first substrate, a second substrate and a liquid crystal layer. In an exemplary embodiment, the display panel 50 includes a first subpixel having a first primary color, a second subpixel having a second primary color and a transparent subpixel. Detailed description about the display panel 50 will be mentioned in FIGS. 12A and 12B.

Figure 12A:
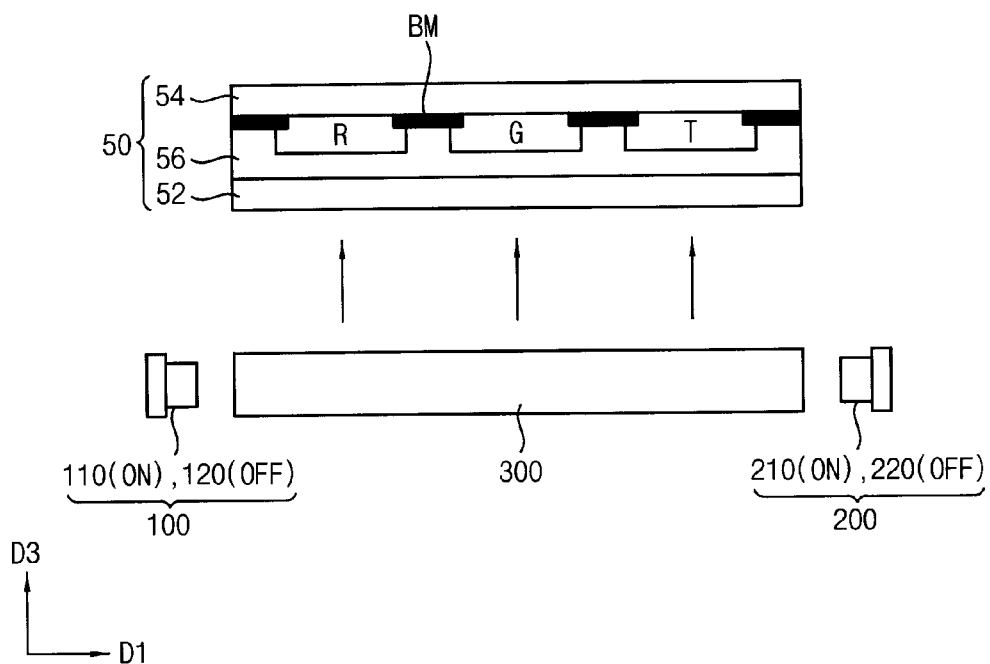
FIGS. 12A and 12B are plan views illustrating a backlight assembly and a display panel to explain a driving of the display apparatus of FIG. 11.
Figure 12B:
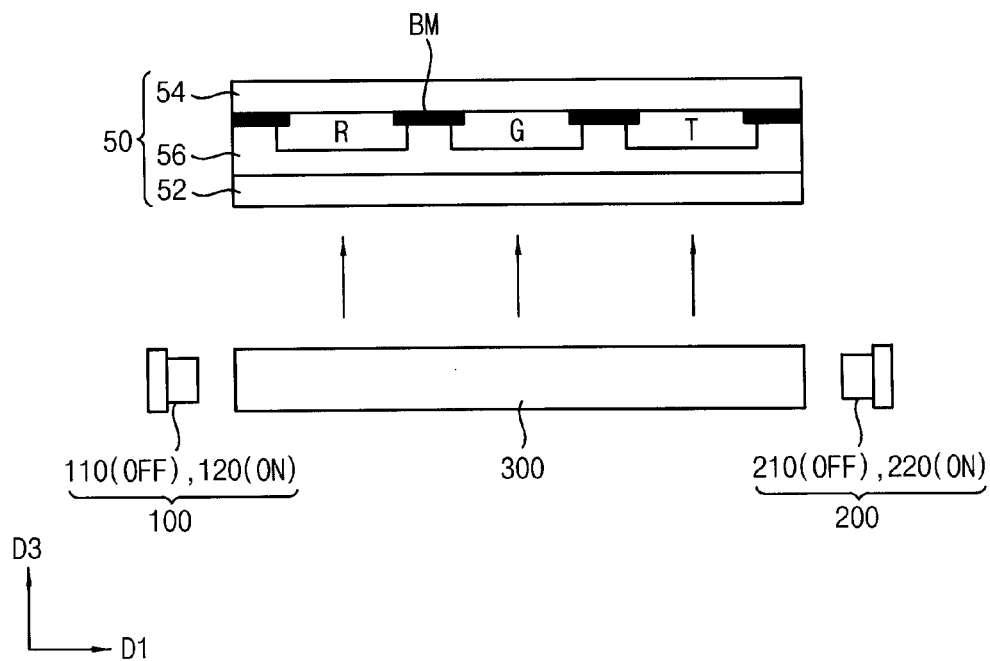

FIGS. 12A and 12B are plan views briefly illustrating a backlight assembly and a display panel to explain a driving of the display apparatus of FIG. 11. More particularly, FIG. 12A is a cross-sectional view illustrating a display panel and light source parts in a first subframe, and FIG. 12B is a cross-sectional view illustrating the display panel and the light source parts in a second subframe.

Referring to FIGS. 12A and 12B, the display apparatus includes a display panel 50, a first light source part 100 including first and second light sources 110 and 120, a second light source part 200 including first and second light sources 210 and 220, a light guiding plate 300 and a panel driver and a light source driver.

The display panel 50 displays an image. The display panel 50 includes a first substrate 52, a second substrate 54 and a liquid crystal layer 56.

The display panel 50 includes a first subpixel R having a first primary color, a second subpixel G having a second primary color and a transparent subpixel T.

In the illustrated exemplary embodiment, the first primary color is red. Accordingly, the first subpixel R is a red subpixel. The second primary color is green. Accordingly, the second subpixel G is a green subpixel. However, the invention is not limited thereto, and various other colors may be used as the first and second primary colors.

The first substrate 52 may be a thin film transistor ("TFT") substrate including a plurality of TFTs. The first substrate 52 may further include a plurality of gate lines extending in a first direction and a plurality of data lines extending in a second direction crossing the first direction. The first substrate 52 may further include a pixel electrode.

The second substrate 54 faces the first substrate 52. In an exemplary embodiment, the second substrate 54 may be a color filter substrate including a plurality of color filters. In an exemplary embodiment, the second substrate 54 may further include a common electrode.

The first subpixel R may be defined by a red color filter disposed on the second substrate 54. The second subpixel G may be defined by a green color filter disposed on the second substrate 54. The transparent subpixel T may be defined by a transparent color filter disposed on the second substrate 54. In an exemplary embodiment, the transparent color filter may be a substantially empty space at which any color filter is not disposed, for example. A light blocking pattern BM may be disposed between the color filters.

The liquid crystal layer 56 is disposed between the first and second substrates 52 and 54.

Although the color filters are disposed on the second substrate 54 in the illustrated exemplary embodiment, the invention is not limited thereto.

The panel driver (not shown) is connected to the display panel 50 to drive the display panel 50. The panel driver may include a timing controller, a gate driver and a data driver.

The timing controller generates a first control signal to control a driving timing of the gate driver, and outputs the first control signal to the gate driver. The timing controller generates a second control signal to control a driving timing of the data driver, and outputs the second control signal to the data driver. The gate driver outputs a gate signal to the gate lines. The data driver outputs a data signal to the data lines.

The panel driver sets grayscale data of the first, second and transparent subpixels R, G and T.

The panel driver generates a light source control signal to control a driving timing of the light source driver (not shown), and outputs the light source control signal to the light source driver. In an exemplary embodiment, the panel driver may be synchronized with the light source driver.

Each of the first and second light source parts 100 and 200 include first light sources 110 and 210 and second light sources 120 and 220. The first and second light source parts 100 and 200 generate a light and provide the light to the display panel 50.

The first light sources 110 and 210 generate a light having a mixed color of the first primary color and the second primary color. In the illustrated exemplary embodiment, the first primary color is red, the second primary color is green, and the mixed color of the first and second primary colors is yellow, for example.

The second light sources 120 and 220 generate a light having a third primary color. In an exemplary embodiment, the third primary color may be blue, for example.

When the first, second and third primary colors are mixed with one another, the mixed color is white. Although the first, second and third primary colors are respectively red, green and blue in the illustrated exemplary embodiment, the invention is not limited thereto, and various other colors may be used as the first, second and third primary colors.

In an exemplary embodiment, the first color may be magenta and the second color may be green, or the first may be cyan and the second color may be red, for example.

In the illustrated exemplary embodiment, the first light source 110 and 210 may be an LED chip which emits a yellow light. The second light source 120 and 220 may be an LED chip which emits a blue light. In an alternative exemplary embodiment, the first light source 110 and 210 may include a blue LED chip and a yellow phosphor.

The light guiding plate 300 guides the light from the first light sources 110 and 210 and the second light sources 120 and 220 to the display panel 50.

In the illustrated exemplary embodiment, the first light source part 100 may be disposed in a first side of the light guiding plate 300. The second light source part 200 may be disposed in a second side of the light guiding plate 300 opposite to the first side of the light guiding plate 300.

Although the first and second light source parts 100 and 200 are an edge type light source part including the light guiding plate 300 and the first light sources 110 and 210 and the second light sources 120 and 220 disposed side portions of the light guiding plate 300 in the illustrated exemplary embodiment, the invention is not limited thereto. In an alternative exemplary embodiment, the first and second light source parts 100 and 200 may be a direct type light source part including a plurality of light sources disposed under the display panel 50 and corresponding to an entire area of the display panel 20.

Although the display apparatus is the liquid crystal display ("LCD") apparatus including the liquid crystal layer 56, the invention is not limited thereto. In an alternative exemplary embodiment, the display apparatus may be organic light emitting diode ("OLED") display apparatus including the OLEDs.

The light source driver is connected to the first and second light source parts. The light source driver drives the first and second light source part. The light source driver repeatedly turns on and off at least one of the first and second light sources 110, 210, 120 and 220.

In the illustrated exemplary embodiment, the light source driver may alternately turn on the first light sources 110 and 210 and the second light sources 120 and 220. In an exemplary embodiment, during a first subframe, the first light source 110 and 210 is turned on and the second light source 210 and 220 is turned off, for example. In contrast, during a second subframe, the first light source 110 and 210 is turned off and the second light source 210 and 220 is turned on.

Duration of the first subframe may be substantially equal to duration of the second frame. In an alternative exemplary embodiment, the duration of the first subframe may be different from the duration of the second frame.

In an exemplary embodiment, the display panel 50 may display the images in a frame rate of about 120 Hz (hertz), for example. The light source driver may alternately turn on the first light sources 110 and 210 and the second light sources 120 and 220 in a frequency of about 120 Hz.

In an exemplary embodiment, the display panel 50 may display a three-dimensional ("3D") image, for example. In an exemplary embodiment, the display panel 50 may alternately display a left image and a right image in a frequency of about 120 Hz. In an exemplary embodiment, the display panel 50 displays two left images in a row and two right images in a row. As a result, the display panel 50 displays the images in a frame rate of about 240 Hz. The light source driver may alternately turn on the first light sources 110 and 210 and the second light sources 120 and 220 in a frequency of about 240 Hz.

The panel driver operates subpixel rendering to set grayscale data of the first subpixel R, the second subpixel G and the transparent subpixel T.

Herein, A is a grayscale of the first primary color, B is a grayscale of the second primary color, C is a grayscale of the third primary color and min(A,B) is a minimum value between A and B. Hereinafter, a first subpixel rendering method is explained.

During the first subframe, when the first light sources 110 and 210 are turned on, the panel driver may set the grayscale data of the first subpixel R to A-min(A,B), the grayscale data of the second subpixel G to B-min(A,B) and the grayscale data of the transparent subpixel T to min(A,B).

During the second subframe, when the second light sources 120 and 220 are turned on, the panel driver may set the grayscale data of the transparent subpixel T to C.

Herein, A is a grayscale of the first primary color, B is a grayscale of the second primary color and C is a grayscale of the third primary color. Hereinafter, a second subpixel rendering method is explained.

During the first subframe, the panel driver may set the grayscale data of the first subpixel R to A, the grayscale data of the second subpixel G to B and the grayscale data of the transparent subpixel T to A+B which is a sum of the grayscale of the first primary color and the grayscale of the second primary color.

During the second subframe, the panel driver may set the grayscale data of the transparent subpixel T to 2 C.

In the second subpixel rendering method, the display panel 50 may have a higher luminance comparing to the first subpixel rendering method.

According to the illustrated exemplary embodiment, the display panel 50 includes red, green and transparent subpixels R, G and T and the first and second light source parts 100 and 200 include yellow and blue light sources YL and BL which are repeatedly turned on and off so that a power consumption of the display apparatus may decrease.

Figure 13:
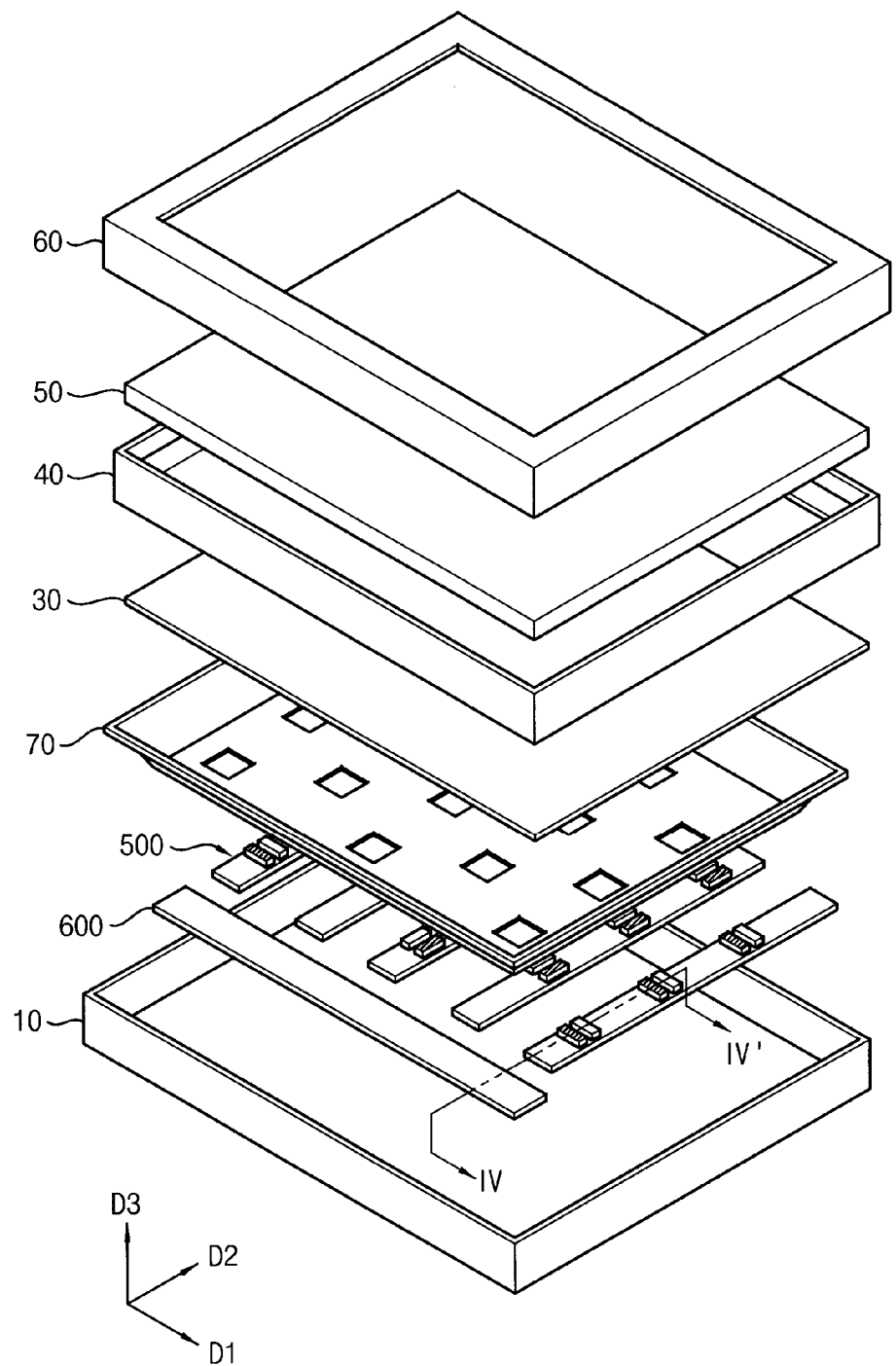
FIG. 13 is an exploded perspective view illustrating another exemplary embodiment of a display apparatus according to the invention.
Figure 14:
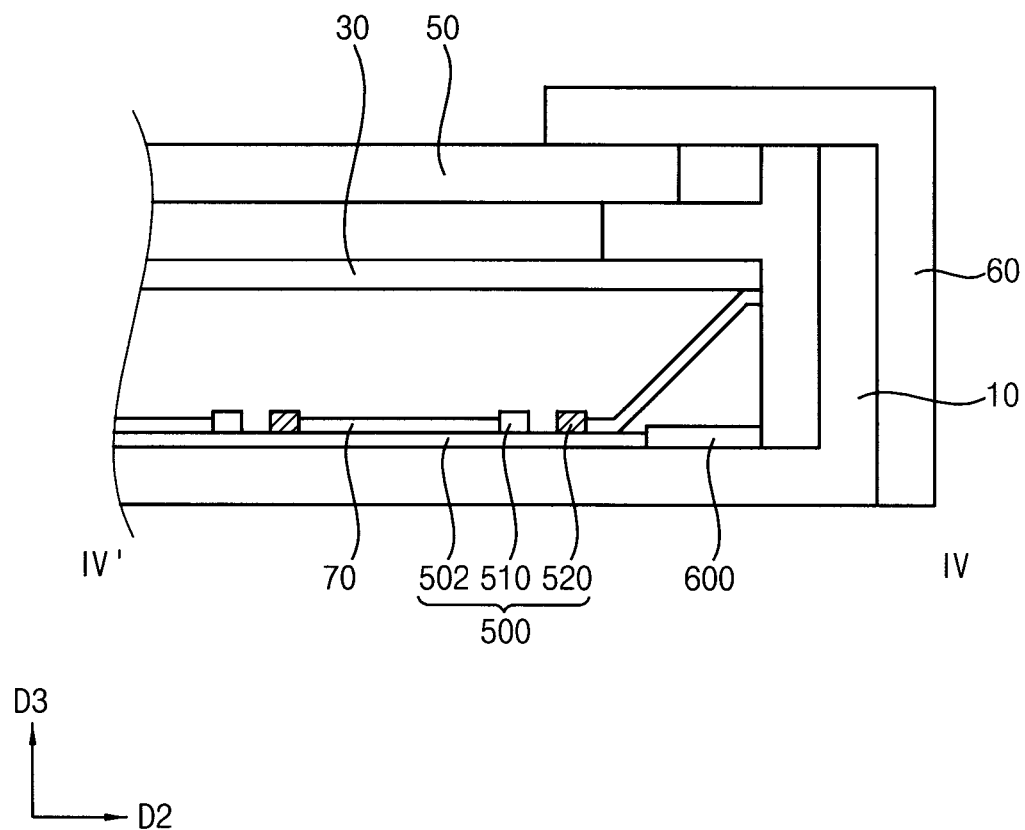
FIG. 14 is a cross-sectional view taken along line VI-VI' of FIG. 13.

FIG. 13 is an exploded perspective view illustrating another exemplary embodiment of a display apparatus according to the invention. FIG. 14 is a cross-sectional view taken along line VI-VI' of FIG. 13.

Referring to FIGS. 13 and 14, a display apparatus includes a receiving container, a backlight assembly, an optical element 30, a mold frame 40 and a display panel 50. The backlight assembly includes a plurality of light source bars 500, a light source driving part 600 and a reflecting sheet 70. The light source bar 500 includes a substrate 502, a first light source 510 and a second light source 520. The receiving container includes a bottom chassis 10 and a top chassis 60.

The bottom chassis 10 and the top chassis 60 receive the backlight assembly, the optical element 30, the mold frame 40 and the display panel 50.

The backlight assembly is substantially same as a backlight assembly of FIG. 7. Thus, any further detailed descriptions concerning the same elements will be omitted.

The optical element 30 is disposed between the display panel 50 and the backlight assembly. The optical elements 30 may improve optical property of the light from the backlight assembly. Thus, the optical element 30 may make brightness of the light from the backlight assembly be uniform. In an exemplary embodiment, the optical element 30 may include plurality of optical sheets. In an exemplary embodiment, optical element 30 may include a protecting sheet, a prism sheet and a diffusion sheet, for example. In an exemplary embodiment, the diffusion sheet may be disposed on a light exiting surface of the backlight assembly. In an exemplary embodiment, the prism sheet may be disposed on the diffusion sheet. In an exemplary embodiment, the protecting sheet may be disposed on the prism sheet. In an exemplary embodiment, the prism sheet may include an upper prism sheet and a lower prism sheet. In an exemplary embodiment, an axis of the upper prism sheet may be substantially perpendicular to an axis of the lower prism sheet. However, the invention is not limited thereto, and many modifications of the optical sheet may be possible.

The mold frame 40 supports the display panel 50, the optical element 30, the reflecting sheet 70, the light source bars 500 and the light source driving part 600 to be fixed in the receiving container. In an exemplary embodiment, the mold frame 40 may include an elastic material.

The display panel 50 includes a first substrate, a second substrate and a liquid crystal layer. The display panel 50 includes a first subpixel having a first primary color, a second subpixel having a second primary color and a transparent subpixel. Detailed description about the display panel 50 is already mentioned in FIGS. 12A and 12B.

According to the exemplary embodiment of the invention, a backlight assembly is divided into a first boundary area, a second boundary area and a middle area, and includes a plurality of first light sources emitting a first color and a plurality of second light sources emitting a second color different from the first color. An arrangement of the first and second light sources in the first and second boundary areas and an arrangement of the first and second light sources in the middle area, so that color stain caused by the first and second light sources may be decreased.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A backlight assembly comprising:
    a plurality of first light sources configured to emit a first color; and
    a plurality of second light sources configured to emit a second color different from the first color,
    wherein the backlight assembly is divided into a first boundary area, a second boundary area spaced apart from the first boundary area in a first direction, and a middle area between the first boundary area and the second boundary area,
    wherein an arrangement direction of a first set of first and second light sources of the plurality of first and second light sources disposed on a same substrate in each of the first and second boundary areas is different from an arrangement direction of a second set of first and second light sources of the plurality of first and second light sources in the middle area, and
    wherein each of the plurality of the first light sources includes two contiguous first light sources defining an arrangement direction of the two contiguous first light sources, the two contiguous first light sources both emit the first color, and each of the plurality of the second light sources includes two contiguous second light sources defining an arrangement direction of the two contiguous second light sources, the two contiguous second light sources both emit the second color,
    wherein the backlight assembly further comprises:
    a first substrate which extends in a second direction which is substantially perpendicular to the first direction, and has a width in a third direction which is substantially perpendicular to the first and second directions; and
    a light guiding plate adjacent to the first substrate;
    wherein first and second light sources of the plurality of first and second light sources are disposed on the first substrate,
    wherein the light guiding plate has a light incident surface and a light exiting surface connected to the light incident surface, the light incident surface and the light exiting surface are substantially perpendicular to each other, the light incident surface faces the first and second light sources.

2. The backlight assembly of claim 1, further comprising:
    a first substrate which extends in a second direction which is substantially perpendicular to the first direction, and has a width in a third direction which is substantially perpendicular to the first and second directions; and
    a light guiding plate adjacent to the first substrate,
    wherein first and second light sources of the plurality of first and second light sources are disposed on the first substrate.

3. The backlight assembly of claim 2, wherein the first and second light sources in the first boundary area are disposed adjacent to each other in the third direction,
    the first and second light sources in the middle area are disposed adjacent to each other in the second direction, and
    the first and second light sources in the second boundary area are disposed adjacent to each other in the third direction.

4. The backlight assembly of claim 3, wherein
    each of the plurality of first light sources comprises a first-a light source and a first-b light source,
    each of the plurality of second light sources comprises a second-a light source and a second-b light source,
    the first-a light source and the first-b light source are electrically connected in serial, and
    the second-a light source and the second-b light source are electrically connected in serial.

5. The backlight assembly of claim 4, wherein
    the plurality of first and second light sources receives a power voltage,
    the first-a light source and the first-b light source receive a first driving signal, and
    the second-a light source and the second-b light source receive a second driving signal which is different from the first driving signal.

6. The backlight assembly of claim 4, wherein
    the first-a and second-a light sources in the first boundary area are disposed adjacent each other in the third direction, the first-b light source and the second-b light source in the middle area are disposed adjacent each other in the second direction.

7. The backlight assembly of claim 3, wherein
each of the plurality of first and second light sources has a width, and a length larger than the width, in a plan view,
each of the plurality of first and second light sources includes a first light emitting diode, and a second light emitting diode spaced part from the first light emitting diode, in a length direction of the plurality of first and second light sources.

8. The backlight assembly of claim 3, further comprising:
a plurality of light source packages, each including one of the first light sources and one of the second light sources,
wherein the plurality of light source packages is arranged in the second direction on the first substrate.

9. The backlight assembly of claim 2, further comprising:
a second substrate spaced apart from the first substrate, and facing the second substrate,
wherein
first and second light sources of the plurality of first and second light sources are disposed on the second substrate, and
the light guiding plate is disposed between the first substrate and the second substrate.

10. The backlight assembly of claim 9, wherein
each of the first light sources of the first substrate faces a corresponding second light source among the second light sources of the second substrate, and
each of the second light sources of the first substrate faces a corresponding first light source among the first light sources of the second substrate.

11. The backlight assembly of claim 1, wherein the plurality of first and second light sources is arranged in a matrix shape in the first direction and a second direction substantially perpendicular to the first direction.

12. The backlight assembly of claim 11, further comprising:
a first light source bar which extends in the second direction, is disposed in the first boundary area and comprises one of the plurality of first light sources and one of the plurality of second light sources disposed adjacent to each other in the second direction;
a second light source bar which is spaced apart from the first light source bar in the first direction, disposed in the middle area and comprises one of the plurality of first light sources and one of the plurality of second light sources disposed adjacent to each other in the first direction;
a third light source bar spaced apart from the second light source bar in the first direction, disposed in the second boundary area, and comprises one of the plurality of first light sources and one of the plurality of second light sources disposed adjacent to each other in the second direction; and
a light source driving part electrically connected to the first to third light source bars.

13. The backlight assembly of claim 12, wherein the first and second light sources disposed in an end of the first light source bar in the second direction are disposed adjacent each other in a fourth direction different from the first and second directions.

14. The backlight assembly of claim 12, further comprises:

a receiving container which receives the first to third light source bars and the light source driving part;
a reflecting sheet which is received in the receiving container, and is disposed on the first to third light source bars, and
openings which are defined in the reflecting sheet and expose the first and second light sources.

15. The backlight assembly of claim 1, wherein
the first color is yellow and the second color is blue,
the first color is magenta and the second color is green, or
the first color is cyan and the second color is red.

16. The backlight assembly of claim 15, wherein
when the plurality of first light sources is in a turned-on state, the plurality of second light sources is turned off, and
when the plurality of second light sources is in a turned-on state, the plurality of first light sources is in a turned-off state.

17. A display apparatus comprising:
a display panel which is configured to display an image;
a backlight assembly which is disposed under the display panel, is configured to supply light to the display panel, and comprises:
a plurality of first light sources configured to emit a first color; and
a plurality of second light sources configured to emit a second color different from the first color, and
a receiving container which receives the display panel and the backlight assembly,
wherein the backlight assembly is divided into a first boundary area, a second boundary area spaced apart from the first boundary area in a first direction, and a middle area between the first boundary area and the second boundary area,
wherein an arrangement direction of a first set of first and second light sources of the plurality of first and second light sources disposed on a same substrate in each of the first and second boundary areas is different from an arrangement direction of a second set of first and second light sources of the plurality of first and second light sources in the middle area, and
wherein each of the plurality of the first light sources includes two contiguous first light sources defining an arrangement direction of the two contiguous first light sources, the two contiguous first light sources both emit the first color, and each of the plurality of the second light sources includes two contiguous second light sources defining an arrangement direction of the two contiguous second light sources, the two contiguous second light sources both emit the second color,
wherein the backlight assembly further comprises:
a first substrate which extends in a second direction which is substantially perpendicular to the first direction, and has a width in a third direction which is substantially perpendicular to the first and second directions; and
a light guiding plate adjacent to the first substrate;
wherein first and second light sources of the plurality of first and second light sources are disposed on the first substrate,
wherein the light guiding plate has a light incident surface and a light exiting surface connected to the light incident surface, the light incident surface and the light exiting surface are substantially perpendicular to each other, the light incident surface faces the first and second light sources.

18. The display apparatus of claim 17, wherein the display panel comprises a first subpixel having the first color, a second subpixel having the second color and a transparent subpixel.

19. The display apparatus of claim 18, wherein the backlight assembly further comprises:
- a first substrate which extends in a second direction substantially perpendicular to the first direction, and has a width in a third direction substantially perpendicular to the first and second directions; and
- a light guiding plate adjacent to the first substrate, and
- wherein first and second light sources of the plurality of first and second light sources are disposed on the first substrate.

20. The display apparatus of claim 18, wherein the plurality of first and second light sources is arranged in a matrix shape in the first direction and a second direction substantially perpendicular to the first direction, and the backlight assembly further comprises:
- a first light source bar which extends in the second direction, is disposed in the first boundary area, and comprises one of the plurality of first light sources and one of the plurality of second light sources disposed adjacent to each other in the second direction;
- a second light source bar which is spaced apart from the first light source bar in the first direction, disposed in the middle area, and comprises one of the plurality of first light sources and one of the plurality of second light sources disposed adjacent to each other in the first direction; and
- a third light source bar spaced apart from the second light source bar in the first direction, disposed in the second boundary area and comprises one of the plurality of first light sources and one of the plurality of second light sources disposed adjacent to each other in the second direction.

* * * * *